United States Patent
Nakajima et al.

(10) Patent No.: US 11,422,154 B2
(45) Date of Patent: Aug. 23, 2022

(54) PHYSICAL QUANTITY DETECTION CIRCUIT, PHYSICAL QUANTITY SENSOR, AND FAILURE DIAGNOSIS METHOD OF PHYSICAL QUANTITY SENSOR

(71) Applicant: Seiko Epson Corporation, Toyko (JP)

(72) Inventors: Kiminori Nakajima, Shiojiri (JP); Takashi Aoyama, Chino (JP)

(73) Assignee: Seiko Epson Corporation

(*) Notice: Subject to any disclaimer, the term of this patent is extended or adjusted under 35 U.S.C. 154(b) by 1 day.

(21) Appl. No.: 17/155,285

(22) Filed: Jan. 22, 2021

(65) Prior Publication Data
US 2021/0231703 A1  Jul. 29, 2021

(30) Foreign Application Priority Data

Jan. 24, 2020 (JP) .............................. JP2020-009865

(51) Int. Cl.
*G01P 21/00* (2006.01)
*G01P 15/00* (2006.01)
*G01P 3/00* (2006.01)

(52) U.S. Cl.
CPC ................ *G01P 21/00* (2013.01); *G01P 3/00* (2013.01); *G01P 15/00* (2013.01)

(58) Field of Classification Search
CPC ..................................................... G01P 21/00
See application file for complete search history.

(56) References Cited

U.S. PATENT DOCUMENTS

| 4,707,758 A | 11/1987 | Matsuda | |
|---|---|---|---|
| 2010/0083757 A1* | 4/2010 | Uemura | G01C 21/16 73/504.12 |
| 2018/0287625 A1* | 10/2018 | Murashima | G01R 31/2884 |

FOREIGN PATENT DOCUMENTS

| JP | S58-54830 A | 3/1983 |
|---|---|---|
| JP | H04-81615 A | 3/1992 |
| JP | 2012-078235 A | 4/2012 |

* cited by examiner

*Primary Examiner* — Walter L Lindsay, Jr.
*Assistant Examiner* — Andrew V Do
(74) *Attorney, Agent, or Firm* — Harness, Dickey & Pierce, P.L.C.

(57) ABSTRACT

A physical quantity detection circuit includes a detection signal generation circuit that generates a detection signal according to a physical quantity based on an output signal of a physical quantity detection element that detects the physical quantity, an analog/digital conversion circuit that converts the detection signal into a digital signal, a reference voltage generation circuit that generates a reference voltage supplied to the analog/digital conversion circuit, and a failure diagnosis circuit that performs a failure diagnosis of the reference voltage generation circuit by monitoring the reference voltage and outputs a failure diagnosis signal indicating a result of the failure diagnosis, in which the failure diagnosis circuit performs the failure diagnosis at a predetermined timing different from a timing when the reference voltage varies temporarily according to an operation of the analog/digital conversion circuit.

10 Claims, 9 Drawing Sheets

| CHANNEL NUMBER | SEL | INPUT SIGNAL OF ADC |
|---|---|---|
| 1 | 000 | GRO1(GRO1_P, GRO1_N) |
| 2 | 001 | GRO2(GRO2_P, GRO2_N) |
| 3 | 010 | AXO(AXO_P, AXO_N) |
| 4 | 011 | AYO(AYO_P, AYO_N) |
| 5 | 100 | TSO(TSO_P, TSO_N) |

PHYSICAL QUANTITY DETECTION CIRCUIT, PHYSICAL QUANTITY SENSOR, AND FAILURE DIAGNOSIS METHOD OF PHYSICAL QUANTITY SENSOR

The present application is based on, and claims priority from JP Application Serial Number 2020-009865, filed Jan. 24, 2020, the disclosure of which is hereby incorporated by reference herein in its entirety.

BACKGROUND

1. Technical Field

The present disclosure relates to a physical quantity detection circuit, a physical quantity sensor, and a failure diagnosis method of the physical quantity sensor.

2. Related Art

Currently, in various systems and electronic apparatuses, a physical quantity sensor capable of detecting various physical quantities such as a gyro sensor that detects an angular velocity and an acceleration sensor that detects acceleration, are widely used. Recently, for example, in order to construct a system that requires high reliability, such as a system mounted on a vehicle, a physical quantity sensor may be required to have a function of diagnosing failure thereof. Further, recently, a physical quantity sensor that outputs physical quantity detection information as digital data with high noise resistance has been used to construct a highly reliable system. Generally, the physical quantity sensor includes a physical quantity detection element and a physical quantity detection circuit that generates an analog signal corresponding to a detected physical quantity, based on a signal output from the physical quantity detection element, converts the analog signal into a digital signal by using an A/D conversion circuit, and thereafter performs digital signal processing.

JP-A-58-54830 discloses a power supply monitoring device of an electronic circuit for a vehicle that monitors an output voltage of a power supply circuit and outputs a power supply failure signal when the output voltage deviates from a predetermined range. Further, JP-A-4-81615 discloses a failure detection device including a plurality of sensors, an AD converter that converts output voltages of the plurality of sensors into digital values, reference voltage supply means for supplying a reference voltage to the plurality of sensors and the AD converter, and means for determining that the reference voltage supply means fails when it is detected that at least two of AD conversion values of the output voltages of the plurality of sensors are out of a predetermined range.

For example, a physical quantity sensor for diagnosing failure thereof is realized by applying the power supply monitoring device described in JP-A-58-54830 or the failure detection device described in JP-A-4-81615.

However, in a physical quantity sensor to which the power supply monitoring device described in JP-A-58-54830 and the failure detection device described in JP-A-4-81615 are applied, there is a risk of erroneously determining that a circuit for generating a reference voltage fails, when a reference voltage varies temporarily and deviates from a predetermined range due to an operation of a signal processing circuit that processes a signal output from a physical quantity detection element and an operation of an analog/digital conversion circuit that converts an output signal of the signal processing circuit into a digital signal.

SUMMARY

One aspect of a physical quantity detection circuit according to the present disclosure includes a detection signal generation circuit that generates a detection signal according to a physical quantity based on an output signal of a physical quantity detection element that detects the physical quantity, an analog/digital conversion circuit that converts the detection signal into a digital signal, a reference voltage generation circuit that generates a reference voltage supplied to the analog/digital conversion circuit, and a failure diagnosis circuit that performs a failure diagnosis of the reference voltage generation circuit by monitoring the reference voltage and outputs a failure diagnosis signal indicating a result of the failure diagnosis, in which the failure diagnosis circuit performs the failure diagnosis at a predetermined timing different from a timing when the reference voltage varies temporarily according to an operation of the analog/digital conversion circuit.

One aspect of a physical quantity detection circuit according to the present disclosure includes a physical quantity signal processing circuit that outputs a drive signal for driving a physical quantity detection element which detects a physical quantity and that generates a detection signal according to the physical quantity based on an output signal of the physical quantity detection element, a reference voltage generation circuit that generates a reference voltage supplied to the physical quantity signal processing circuit, and a failure diagnosis circuit that performs a failure diagnosis of the reference voltage generation circuit by monitoring the reference voltage and outputs a failure diagnosis signal indicating a result of the failure diagnosis, in which the failure diagnosis circuit performs the failure diagnosis at a predetermined timing different from a timing when the reference voltage varies temporarily according to an operation of the physical quantity signal processing circuit.

One aspect of a physical quantity sensor according to the present disclosure includes one aspect of the physical quantity detection circuit, and the physical quantity detection element.

One aspect of a failure diagnosis method of a physical quantity sensor according to the present disclosure is a failure diagnosis method of a physical quantity sensor including a physical quantity detection element that detects a physical quantity, a detection circuit that generates a detection signal according to the physical quantity based on an output signal of the physical quantity detection element, an analog/digital conversion circuit that converts the detection signal into a digital signal, and a reference voltage generation circuit that generates a reference voltage supplied to the analog/digital conversion circuit, and includes a failure diagnosis step of performing a failure diagnosis of the reference voltage generation circuit by monitoring the reference voltage and outputting a failure diagnosis signal indicating a result of the failure diagnosis, in which the failure diagnosis is performed at a predetermined timing different from a timing when the reference voltage varies temporarily according to an operation of the analog/digital conversion circuit during the failure diagnosis step.

One aspect of a failure diagnosis method of a physical quantity sensor according to the present disclosure is a failure diagnosis method of a physical quantity sensor including a physical quantity detection element that detects a physical quantity, a physical quantity signal processing circuit that outputs a drive signal for driving the physical quantity detection element and generates a detection signal according to the physical quantity based on an output signal of the physical quantity detection element, and a reference voltage generation circuit that generates a reference voltage supplied to the physical quantity signal processing circuit, and includes a failure diagnosis step of performing a failure diagnosis of the reference voltage generation circuit by monitoring the reference voltage and outputting a failure diagnosis signal indicating a result of the failure diagnosis, in which the failure diagnosis is performed at a predetermined timing different from a timing when the reference voltage varies temporarily according to an operation of the physical quantity signal processing circuit during the failure diagnosis step.

DESCRIPTION OF EXEMPLARY EMBODIMENTS

Hereinafter, preferred embodiments of the present disclosure will be described in detail with reference to the drawings. The embodiments described below do not unduly limit the contents of the present disclosure described in the appended claims. Also, not all of the configurations described below are essential constituent requirements of the present disclosure.

Hereinafter, a physical quantity sensor that detects an angular velocity and acceleration as physical quantities will be described as an example.

Figure 1:
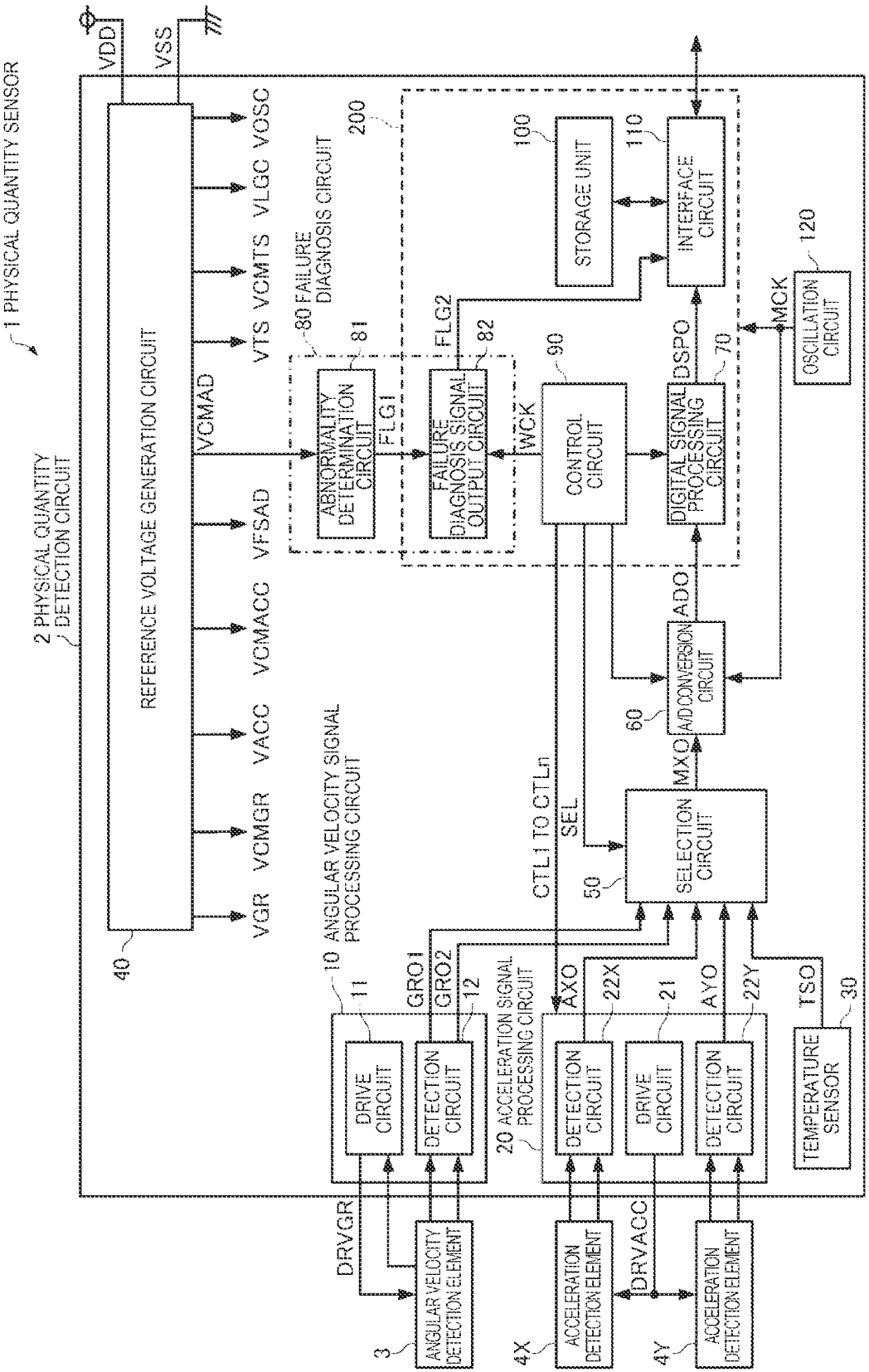
FIG. 1 is a functional block diagram of a physical quantity sensor according to a first embodiment.

1. Physical Quantity Sensor 1-1. First Embodiment 1-1-1. Configuration of Physical Quantity Sensor FIG. 1 is a functional block diagram of a physical quantity sensor according to a first embodiment. A physical quantity sensor 1 according to the first embodiment includes a physical quantity detection circuit 2, an angular velocity detection element 3, an acceleration detection element 4X, and an acceleration detection element 4Y.

The acceleration detection elements 4X and 4Y are physical quantity detection elements that detect acceleration as a physical quantity. The acceleration detection element 4X detects acceleration in a direction of an X axis, and the acceleration detection element 4Y detects acceleration in a direction of a Y axis orthogonal to the X axis. For example, each of the acceleration detection elements 4X and 4Y includes a capacitor having a drive electrode and a detection electrode (not illustrated) and may be an element in which a charge amount of the capacitor changes according to the acceleration and which outputs a signal corresponding to the charge amount. The acceleration detection elements 4X and 4Y may be, for example, micro electro mechanical systems (MEMS) elements.

The angular velocity detection element 3 is a physical quantity detection element that detects an angular velocity as a physical quantity. In the present embodiment, the angular velocity detection element 3 detects an angular velocity around a Z axis orthogonal to the X axis and the Y axis. For example, the angular velocity detection element 3 includes a vibrator element in which a drive electrode and a detection electrode (not illustrated) are arranged, and may be an element in which a magnitude of vibration of the vibrator element changes according to the angular velocity and which outputs a signal corresponding to the magnitude of the vibration. The angular velocity detection element 3 may be an element having, for example, a so-called double T type quartz crystal vibrator element having two T-type drive vibration arms.

The physical quantity detection circuit 2 includes an angular velocity signal processing circuit 10, an acceleration signal processing circuit 20, a temperature sensor 30, a reference voltage generation circuit 40, a selection circuit 50, an analog/digital conversion circuit 60, a digital signal processing circuit 70, a failure diagnosis circuit 80, a control circuit 90, a storage unit 100, an interface circuit 110, and an oscillation circuit 120. The physical quantity detection circuit 2 may be realized by, for example, a one-chip integrated circuit (IC). The physical quantity detection circuit 2 may have a configuration in which part of the elements is omitted or changed, or other elements are added.

The reference voltage generation circuit 40 generates various reference voltages based on a power supply voltage VDD and a ground voltage VSS supplied from the outside of the physical quantity detection circuit 2. In the present embodiment, the reference voltage generation circuit 40 generates a power supply voltage VGR and a common voltage VCMGR as reference voltages to be supplied to the angular velocity signal processing circuit 10. Further, the reference voltage generation circuit 40 generates a power supply voltage VACC and a common voltage VCMACC as reference voltages to be supplied to the acceleration signal processing circuit 20. Further, the reference voltage generation circuit 40 generates a full-scale voltage VFSAD and a common voltage VCMAD as reference voltages to be supplied to the analog/digital conversion circuit 60. Further, the reference voltage generation circuit 40 generates a power supply voltage VTS and a common voltage VCMTS as reference voltages to be supplied to the temperature sensor 30. Further, the reference voltage generation circuit 40 generates a power supply voltage VLGC as a reference voltage to be supplied to a logic circuit 200. Further, the reference voltage generation circuit 40 generates a power supply voltage VOSC as a reference voltage to be supplied to the oscillation circuit 120.

The oscillation circuit 120 operates based on the power supply voltage VOSC supplied from the reference voltage generation circuit 40 and generates a clock signal MCK. The oscillation circuit 120 may be configured by, for example, a ring oscillator or a CR oscillation circuit.

The angular velocity signal processing circuit 10 includes a drive circuit 11 and a detection circuit 12 and operates based on the power supply voltage VGR and the common voltage VCMGR supplied from the reference voltage generation circuit 40.

The drive circuit 11 generates a drive signal DRVGR for performing an excitation vibration of the angular velocity detection element 3 and supplies the drive signal DRVGR to the angular velocity detection element 3. For example, the drive signal DRVGR is a square wave signal having the power supply voltage VGR of a high level and the ground voltage VSS of a low level. Further, the drive circuit 11 receives an oscillation current generated by the excitation vibration of the angular velocity detection element 3, and feedback-controls an amplitude level of the drive signal such that an amplitude of the oscillation current is held constantly. If an angular velocity around the Z axis is applied in a state of the excitation vibration, the angular velocity detection element 3 detects the angular velocity and outputs a signal corresponding to the angular velocity. In the present embodiment, the signal output from the angular velocity detection element 3 is a differential signal.

The detection circuit 12 is a detection signal generation circuit that generates a detection signal corresponding to the angular velocity around the Z axis based on an output signal of the angular velocity detection element 3. Specifically, the detection circuit 12 detects an angular velocity component included in the signal output from the angular velocity detection element 3 and generates and outputs an angular velocity detection signal GRO1 having a voltage level corresponding to a magnitude of the angular velocity component. Further, the detection circuit 12 detects a vibration leakage component included in the signal output from the angular velocity detection element 3 and generates and outputs a vibration leakage signal GRO2 having a voltage level corresponding to a magnitude of the vibration leakage component. In the present embodiment, each of the angular velocity detection signal GRO1 and the vibration leakage signal GRO2 is a differential signal that uses the common voltage VCMGR as a reference.

As described above, the angular velocity signal processing circuit 10 is a physical quantity signal processing circuit that outputs the drive signal DRVGR for driving the angular velocity detection element 3 and generates a detection signal according to an angular velocity around the Z axis, which is one of the physical quantities, based on an output signal of the angular velocity detection element 3.

The acceleration signal processing circuit 20 includes a drive circuit 21, a detection circuit 22X, and a detection circuit 22Y, and operates based on the power supply voltage VACC and the common voltage VCMACC supplied from the reference voltage generation circuit 40. Further, the acceleration signal processing circuit 20 is controlled based on n control signals CTL1 to CTLn supplied from the control circuit 90. n is an integer of 1 or more.

The drive circuit 21 generates a drive signal DRVACC and outputs the drive signal to the acceleration detection elements 4X and 4Y to drive the acceleration detection elements 4X and 4Y. The drive signal DRVACC is, for example, a square wave signal having the power supply voltage VACC of a high level and the ground voltage VSS of a low level. When acceleration is applied in the X-axis direction in this state, the acceleration detection element 4X detects the acceleration and outputs a signal corresponding to the acceleration. Further, when an acceleration is applied in the Y-axis direction, the acceleration detection element 4Y detects the acceleration and outputs a signal corresponding to the acceleration. In the present embodiment, each of the signals output from the acceleration detection elements 4X and 4Y is a differential signal.

The detection circuit 22X is a detection signal generation circuit that generates a detection signal corresponding to the acceleration in the X-axis direction based on the output signal of the acceleration detection element 4X. Specifically, the detection circuit 22X detects an acceleration component included in a signal output from the acceleration detection element 4X, generates and outputs an X-axis acceleration detection signal AXO having a voltage level corresponding to a magnitude of the acceleration component. In the present embodiment, the X-axis acceleration detection signal AXO is a differential signal that uses the common voltage VCMACC as a reference.

The detection circuit 22Y is a detection signal generation circuit that generates a detection signal corresponding to the acceleration in the Y-axis direction based on the output signal of the acceleration detection element 4Y. Specifically, the detection circuit 22Y detects an acceleration component included in a signal output from the acceleration detection element 4Y, generates and outputs a Y-axis acceleration detection signal AYO having a voltage level corresponding to a magnitude of the acceleration component. In the present embodiment, the Y-axis acceleration detection signal AYO is a differential signal that uses the common voltage VCMACC as a reference.

As described above, the acceleration signal processing circuit 20 is a physical quantity signal processing circuit that outputs the drive signal DRVACC for driving the acceleration detection elements 4X and 4Y, generates a detection signal corresponding to the acceleration in the X-axis direction which is one of the physical quantities, based on the output signal of the acceleration detection element 4X, and generates a detection signal corresponding to the acceleration in the Y-axis direction which is one of the physical quantities, based on the output signal of the acceleration detection element 4Y.

The temperature sensor 30 detects a temperature based on the power supply voltage VTS and the common voltage VCMTS supplied from the reference voltage generation circuit 40, and outputs a temperature detection signal ISO of a voltage level corresponding to the temperature. The temperature sensor 30 may be, for example, a circuit that uses temperature characteristics of a bandgap reference circuit. In the present embodiment, the temperature detection signal ISO is a differential signal that uses the common voltage VCMTS as a reference.

The selection circuit 50 selects any one of the angular velocity detection signal GRO1, the vibration leakage signal GRO2, the X-axis acceleration detection signal AXO, the Y-axis acceleration detection signal AYO, and the temperature detection signal TSO, based on a selection signal SEL from the control circuit 90 and outputs the selected signal. In the present embodiment, an output signal MXO of the selection circuit 50 is a differential signal.

The analog/digital conversion circuit 60 operates based on the full-scale voltage VFSAD and the common voltage VCMAD supplied from the reference voltage generation circuit 40. The analog/digital conversion circuit 60 converts the output signal MXO of the selection circuit 50 into a digital signal ADO based on various control signals supplied from the control circuit 90 and outputs the digital signal. Specifically, the analog/digital conversion circuit 60 converts the signal MXO, which is a differential signal, into the digital signal ADO, with a voltage difference between the full-scale voltage VFSAD and the ground voltage VSS as a full scale.

The digital signal processing circuit 70 processes the digital signal ADO output from the analog/digital conversion circuit 60 based on the various control signals supplied from the control circuit 90. For example, the digital signal processing circuit 70 outputs a digital signal DSPO obtained by performing digital filter processing and correction arithmetic processing of the digital signal ADO.

The failure diagnosis circuit 80 monitors the common voltage VCMAD, performs a failure diagnosis of the reference voltage generation circuit 40, and outputs a failure diagnosis signal FLG2 indicating a result of the failure diagnosis. Particularly, in the present embodiment, the failure diagnosis circuit 80 performs the failure diagnosis of the reference voltage generation circuit 40 at a predetermined timing different from the timing when the common voltage VCMAD varies temporarily depending on an operation of the analog/digital conversion circuit 60.

For example, the timing when the common voltage VCMAD varies temporarily is the timing when the analog/digital conversion circuit 60 starts to sample the output signal MXO of the selection circuit 50, and the failure diagnosis circuit 80 may perform the failure diagnosis at a predetermined timing different from the timing. Further, for example, the timing when the common voltage VCMAD varies temporarily is the timing when the analog/digital conversion circuit 60 ends the sampling of the output signal MXO of the selection circuit 50, and the failure diagnosis circuit 80 may perform the failure diagnosis at a predetermined timing different from the timing.

In the present embodiment, the failure diagnosis circuit 80 includes an abnormality determination circuit 81 and a failure diagnosis signal output circuit 82.

The abnormality determination circuit 81 determines whether or not the common voltage VCMAD is abnormal, and outputs an abnormality determination signal FLG1 indicating a determination result. For example, the abnormality determination signal FLG1 may be a flag signal that goes to a high level when the common voltage VCMAD is abnormal and goes to a low level when the common voltage VCMAD is normal.

The failure diagnosis signal output circuit 82 acquires the abnormality determination signal FLG1 at a predetermined timing and outputs the failure diagnosis signal FLG2. For example, the failure diagnosis signal FLG2 may be a flag signal that goes to a high level when the reference voltage generation circuit 40 fails and goes to a low level when the reference voltage generation circuit 40 does not fail. In the present embodiment, the failure diagnosis signal output circuit 82 acquires the abnormality determination signal FLG1 at a timing of a rising edge of a clock signal WCK supplied from the control circuit 90 and outputs the failure diagnosis signal FLG2. As will be described below, the timing of the rising edge of the clock signal WCK is a predetermined timing different from the timing when the common voltage VCMAD varies temporarily with an operation of the analog/digital conversion circuit 60.

The control circuit 90 generates and outputs various control signals for controlling operations of the analog/digital conversion circuit 60, the digital signal processing circuit 70, and the like, the clock signal WCK, the selection signal SEL, and the control signals CTL1 to CTLn for controlling the acceleration signal processing circuit 20.

The storage unit 100 includes a nonvolatile memory (not illustrated), and the nonvolatile memory stores various trimming data for the angular velocity signal processing circuit 10, the acceleration signal processing circuit 20, and the like, coefficient data used for processing performed by the digital signal processing circuit 70, and the like. The nonvolatile memory may be configured as, for example, a metal oxide nitride oxide silicon (MONOS) type memory or an electrically erasable programmable read-only memory (EEPROM). Furthermore, the storage unit 100 may have a configuration in which a register (not illustrated) is included, and when the physical quantity detection circuit 2 is powered on, that is, when a voltage of a VDD terminal rises from 0 V to a desirable voltage, various data stored in the nonvolatile memory are transferred to a register to be held therein, and the various data held in the register are supplied to the respective circuits.

The interface circuit 110 performs processing of outputting the digital signal DSPO and the failure diagnosis signal FLG2 according to a request from an external device. Further, the interface circuit 110 performs processing of reading and outputting data stored in a nonvolatile memory or a register of the storage unit 100, processing of writing data input from the external device to the nonvolatile memory or the register of the storage unit 100, and the like according to a request from the external device of the physical quantity detection circuit 2. The interface circuit 110 may be, for example, an interface circuit of a serial peripheral interface (SPI) bus or an interface circuit of an inter-integrated circuit (I$^2$C) bus.

The digital signal processing circuit 70, the failure diagnosis signal output circuit 82, the control circuit 90, the storage unit 100, and the interface circuit 110 configure the logic circuit 200. The logic circuit 200 operates in response to the clock signal MCK based on the power supply voltage VLGC supplied from the reference voltage generation circuit 40.

1-1-2. Configuration of Selection Circuit and Analog/Digital Conversion Circuit

Figures 2, 3:
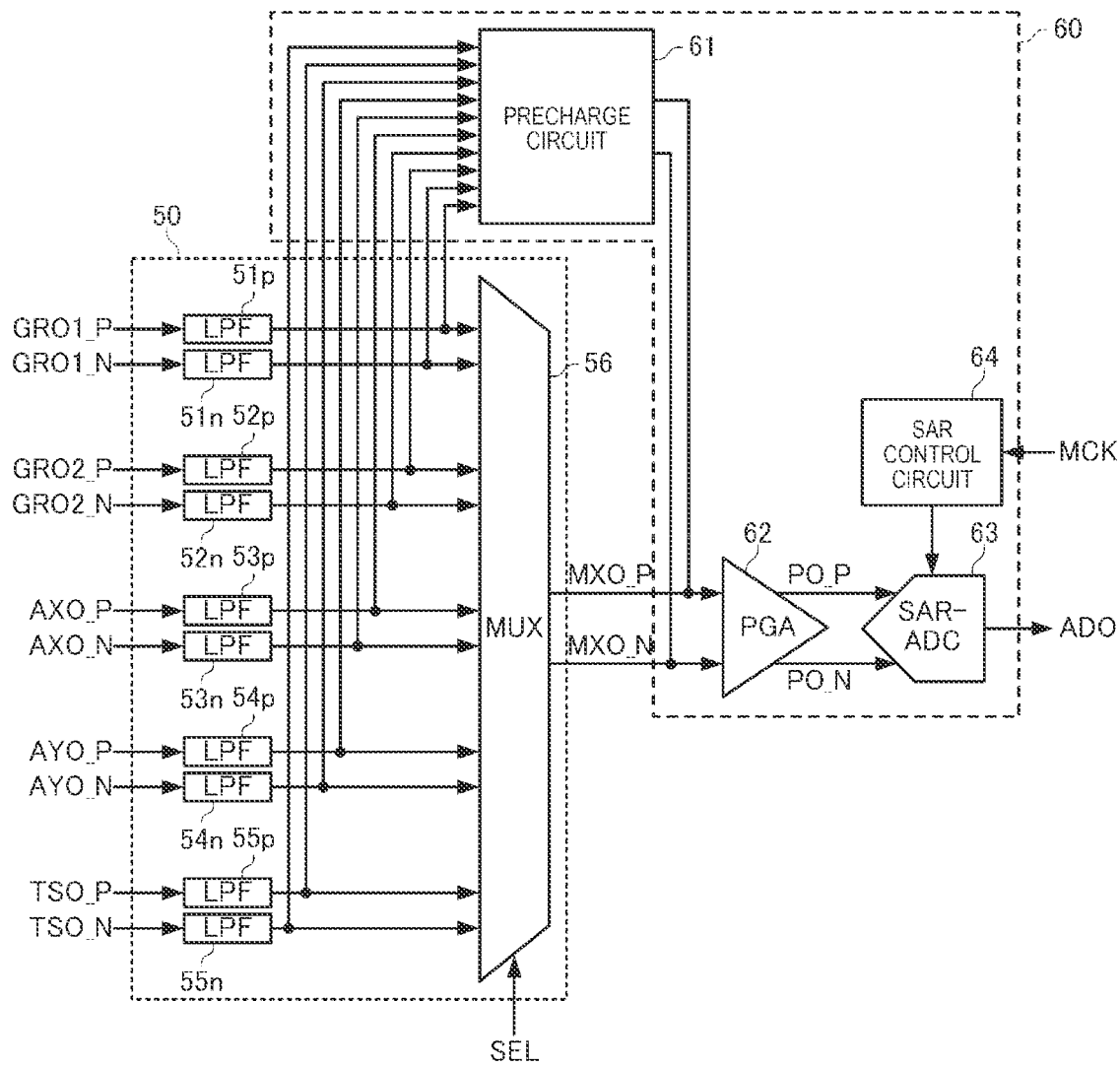
FIG. 2 is a diagram illustrating a configuration example of a selection circuit and an analog/digital conversion circuit.
FIG. 3 is a diagram illustrating an example of a channel configuration of time division processing performed by the analog/digital conversion circuit.

FIG. 2 is a diagram illustrating a configuration example of the selection circuit 50 and the analog/digital conversion circuit 60. In the example of FIG. 2, the selection circuit 50 includes ten low pass filters 51$p$, 51$n$, 52$p$, 52$n$, 53$p$, 53$n$, 54$p$, 54$n$, 55$p$, and 55$n$ and a multiplexer 56.

Differential signals GRO1_P and GRO1_N configuring the angular velocity detection signal GRO1 are low-pass-filtered by the low pass filters 51$p$ and 51$n$, respectively, and input to the multiplexer 56.

Differential signals GRO2_P and GRO2_N configuring the vibration leakage signal GRO2 are low-pass-filtered by the low pass filters 52$p$ and 52$n$, respectively, and input to the multiplexer 56.

Differential signals AXO_P and AXO_N configuring the X-axis acceleration detection signal AXO are low-pass-filtered by the low pass filters 53$p$ and 53$n$, respectively and input to the multiplexer 56.

Differential signals AYO_P and AYO_N configuring the Y-axis acceleration detection signal AYO are low-pass-filtered by the low pass filters 54p and 54n, respectively, and input to the multiplexer 56.

Differential signals ISO_P and ISO_N configuring the temperature detection signal TSO are low-pass-filtered by the low pass filters 55p and 55n, respectively, and input to the multiplexer 56.

The multiplexer 56 selects any differential signal of the low-pass-filtered differential signals GRO1_P and GRO1_N, the low-pass-filtered differential signals GRO2_P and GRO2_N, the low-pass-filtered differential signals AXO_P and AXO_N, the low-pass-filtered differential signals AYO_P and AYO_N, and the low-pass-filtered differential signals ISO_P and ISO_N, according to the selection signal SEL, and outputs as differential signals MXO_P and MXO_N.

In the example of FIG. 2, the analog/digital conversion circuit 60 includes a precharge circuit 61, a programmable gain amplifier 62, a successive approximation register (SAR) type analog/digital converter 63, and a SAR control circuit 64.

The precharge circuit 61 charges an input node of the programmable gain amplifier 62 according to a control signal supplied from the control circuit 90 before conversion processing performed by the successive approximation type analog/digital converter 63 starts, thereby, assisting charging by the differential signals MXO_P and MXO_N.

The programmable gain amplifier 62 outputs differential signals PO_P and PO_N obtained by amplifying the differential signals MXO_P and MXO_N. A gain of the programmable gain amplifier 62 is variably set depending on the type of differential signals selected as the differential signals MXO_P and MXO_N according to the control signal supplied from the control circuit 90.

The successive approximation type analog/digital converter 63 sets a voltage difference between the full-scale voltage VFSAD and the ground voltage VSS as a full scale, converts a voltage difference between the differential signals PO_P and PO_N into the digital signal ADO, and outputs the digital signal ADO.

The SAR control circuit 64 operates according to the clock signal MCK and performs processing or the like of selecting a voltage serving as a reference for comparison according to the timing of a successive approximation by the successive approximation type analog/digital converter 63 and the comparison result.

1-1-3. Channel Configuration for Time Division Processing

As described above, the analog/digital conversion circuit 60 converts the differential signal selected by the selection circuit 50 based on the selection signal SEL into the digital signal ADO and outputs the digital signal. That is, the analog/digital conversion circuit 60 processes the angular velocity detection signal GRO1, the vibration leakage signal GRO2, the X-axis acceleration detection signal AXO, the Y-axis acceleration detection signal AYO, and the temperature detection signal TSO in a time division manner to convert the signals into digital signals.

FIG. 3 is a diagram illustrating an example of a channel configuration for time division processing performed by the analog/digital conversion circuit 60.

As illustrated in FIG. 3, in a first channel, the selection signal SEL of three bits is "000", and the selection circuit 50 selects the angular velocity detection signal GRO1 as an input signal of the analog/digital conversion circuit 60. Thus, the analog/digital conversion circuit 60 converts the angular velocity detection signal GRO1, specifically a voltage difference between the differential signals GRO1_P and GRO1_N into the digital signal ADO during a period of the first channel. As such, in the first channel, processing for the angular velocity detection signal GRO1 is performed.

In a second channel subsequent to the first channel, the selection signal SEL of three bits is "001", and the selection circuit 50 selects the vibration leakage signal GRO2 as the input signal of the analog/digital conversion circuit 60. Thus, the analog/digital conversion circuit 60 converts the vibration leakage signal GRO2, specifically a voltage difference between the differential signals GRO2_P and GRO2_N into the digital signal ADO during a period of the second channel. As such, in the second channel, processing for the vibration leakage signal GRO2 is performed.

In a third channel subsequent to the second channel, the selection signal SEL of three bits is "010", and the selection circuit 50 selects the X-axis acceleration detection signal AXO as the input signal of the analog/digital conversion circuit 60. Thus, the analog/digital conversion circuit 60 converts the X-axis acceleration detection signal AXO, specifically a voltage difference between the differential signals AXO_P and AXO_N into the digital signal ADO during a period of the third channel. As such, in the third channel, processing for the X-axis acceleration detection signal AXO is performed.

In a fourth channel subsequent to the third channel, the selection signal SEL of three bits is "011", and the selection circuit 50 selects the Y-axis acceleration detection signal AYO as the input signal of the analog/digital conversion circuit 60. Thus, the analog/digital conversion circuit 60 converts the Y-axis acceleration detection signal AYO, specifically a voltage difference between the differential signals AYO_P and AYO_N into the digital signal ADO during a period of the fourth channel. As such, in the fourth channel, processing for the Y-axis acceleration detection signal AYO is performed.

In a fifth channel subsequent to the fourth channel, the selection signal SEL of three bits is "100", and the selection circuit 50 selects the temperature detection signal ISO as the input signal of the analog/digital conversion circuit 60. Thus, the analog/digital conversion circuit 60 converts the temperature detection signal TSO, specifically, a voltage difference between the differential signals ISO_P and ISO_N into the digital signal ADO during a period of the fifth channel. As such, in the fifth channel, processing for the temperature detection signal TSO is performed.

After the fifth channel, the processing returns to the first channel. That is, a plurality of periods of the first channel to the fifth channel are sequentially repeated. In the digital signal processing circuit 70, a numerical order and a coefficient value of a digital filter, a type and a coefficient value of a correction arithmetic, and the like are changed according to a signal to be processed, for each channel.

1-1-4. Configuration of Failure Diagnosis Circuit

Figure 4:
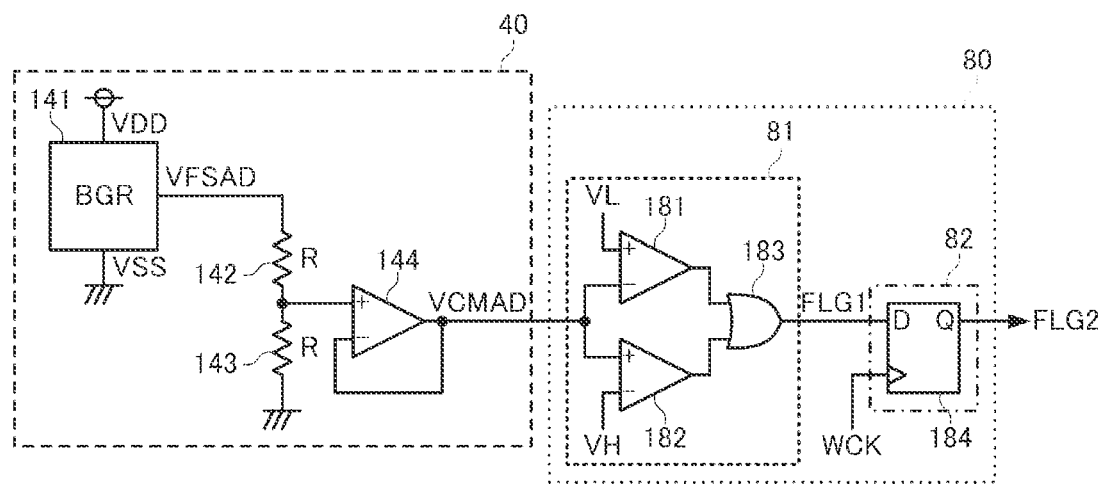
FIG. 4 is a diagram illustrating a configuration example of part of a reference voltage generation circuit and a failure diagnosis circuit, according to the first embodiment.

FIG. 4 is a diagram illustrating a configuration example of part of the reference voltage generation circuit 40 and the failure diagnosis circuit 80. In an example of FIG. 4, the reference voltage generation circuit 40 includes a bandgap reference circuit 141, resistors 142 and 143, and an operational amplifier 144.

The bandgap reference circuit 141 generates the constant full-scale voltage VFSAD that is stable against a variation in temperature and power supply voltage VDD by using a bandgap voltage of a semiconductor element. The configuration of the bandgap reference circuit is well known, and thus, illustration and description thereof will be omitted.

The resistors 142 and 143 have the same resistance value R, and a voltage obtained by dividing the full-scale voltage VFSAD in half by using the resistors 142 and 143 is supplied to a non-inverting input terminal of the operational amplifier 144.

An inverting input terminal of the operational amplifier 144 is coupled to an output terminal of the operational amplifier 144, and the operational amplifier 144 functions as a voltage follower. Thus, the output terminal of the operational amplifier 144 is half a voltage of the full-scale voltage VFSAD, and this voltage is output from the reference voltage generation circuit 40 as the common voltage VCMAD.

The failure diagnosis circuit 80 includes comparators 181 and 182, a logical sum circuit 183, and a D flip-flop 184.

The common voltage VCMAD is supplied to an inverting input terminal of the comparator 181, and a predetermined threshold voltage VL is supplied to a non-inverting input terminal of the comparator 181. An output terminal of the comparator 181 goes to a low level when the common voltage VCMAD is higher than or equal to the threshold voltage VL and goes to a high level when the common voltage VCMAD is lower than the threshold voltage VL.

The common voltage VCMAD is supplied to a non-inverting input terminal of the comparator 182, and a predetermined threshold voltage VH higher than the threshold voltage VL is supplied to an inverting input terminal of the comparator 182. An output terminal of the comparator 182 goes to a low level when the common voltage VCMAD is less than or equal to the threshold voltage VH and goes to a high level when the common voltage VCMAD is higher than the threshold voltage VH.

The logical sum circuit 183 receives output signals of the comparators 181 and 182 and outputs a logical sum signal of the output signals. That is, an output signal of the logical sum circuit 183 is at a low level when both the output signals of the comparators 181 and 182 are at a low level and is at a high level when at least one of the output signals of the comparators 181 and 182 is at a high level.

Thus, the output signal of the logical sum circuit 183 goes to a low level when the common voltage VCMAD is higher than or equal to the threshold voltage VL and lower than or equal to the threshold voltage VH, and goes to a high level when the common voltage VCMAD is lower than the threshold voltage VL or higher than the threshold voltage VH. The abnormality determination circuit 81 is configured by the comparators 181 and 182 and the logical sum circuit 183, and the output signal of the logical sum circuit 183 becomes the abnormality determination signal FLG1. That is, the abnormality determination circuit 81 determines that the common voltage VCMAD is normal when the common voltage VCMAD is higher than or equal to the threshold voltage VL and is lower than or equal to the threshold voltage VH, and determines that the common voltage VCMAD is abnormal when the common voltage VCMAD is lower than the threshold voltage VL or higher than the threshold voltage VH, and outputs the abnormality determination signal FLG1 indicating the determination result.

The threshold voltages VL and VH may be fixed values or may be variably set in the storage unit 100.

The D flip-flop 184 has a data input terminal D that receives the abnormality determination signal FLG1 and has a clock input terminal that receives the clock signal WCK. The D flip-flop 184 acquires the abnormality determination signal FLG1 at the timing of the rising edge of the clock signal WCK and outputs the failure diagnosis signal FLG2.

In the example of FIG. 4, the common voltage VCMAD is obtained by dividing the full-scale voltage VFSAD in half by using the resistors 142 and 143, and thus, when the full-scale voltage VFSAD is constantly abnormal, the common voltage VCMAD is constantly abnormal, and the abnormality determination signal FLG1 is constantly at a high level. Thus, even when the common voltage VCMAD is constantly abnormal because the operational amplifier 144 fails, and even when the full-scale voltage VFSAD is constantly abnormal because the bandgap reference circuit 141 fails, the failure diagnosis signal FLG2 is at a high level, and thus, the failure diagnosis circuit 80 can diagnose that the reference voltage generation circuit 40 fails.

Figure 5:
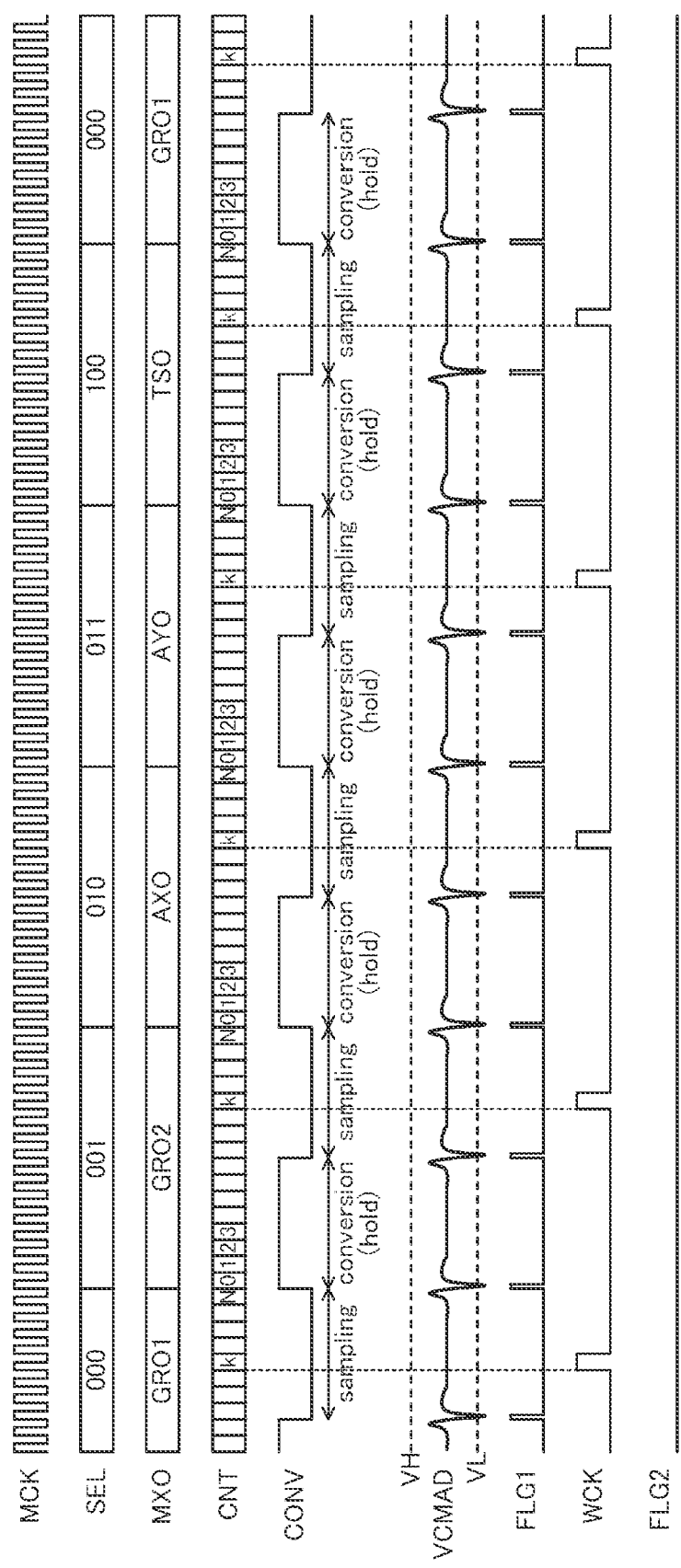
FIG. 5 is a diagram illustrating an example of waveforms of various signals when the reference voltage generation circuit does not fail in the first embodiment.

FIG. 5 is a diagram illustrating an example of waveforms of various signals including the common voltage VCMAD, the abnormality determination signal FLG1, and the failure diagnosis signal FLG2 when the reference voltage generation circuit 40 does not fail. Further, FIG. 6 is a diagram illustrating an example of waveforms of various signals including the common voltage VCMAD, the abnormality determination signal FLG1, and the failure diagnosis signal FLG2 when the reference voltage generation circuit 40 fails.

Figure 6:
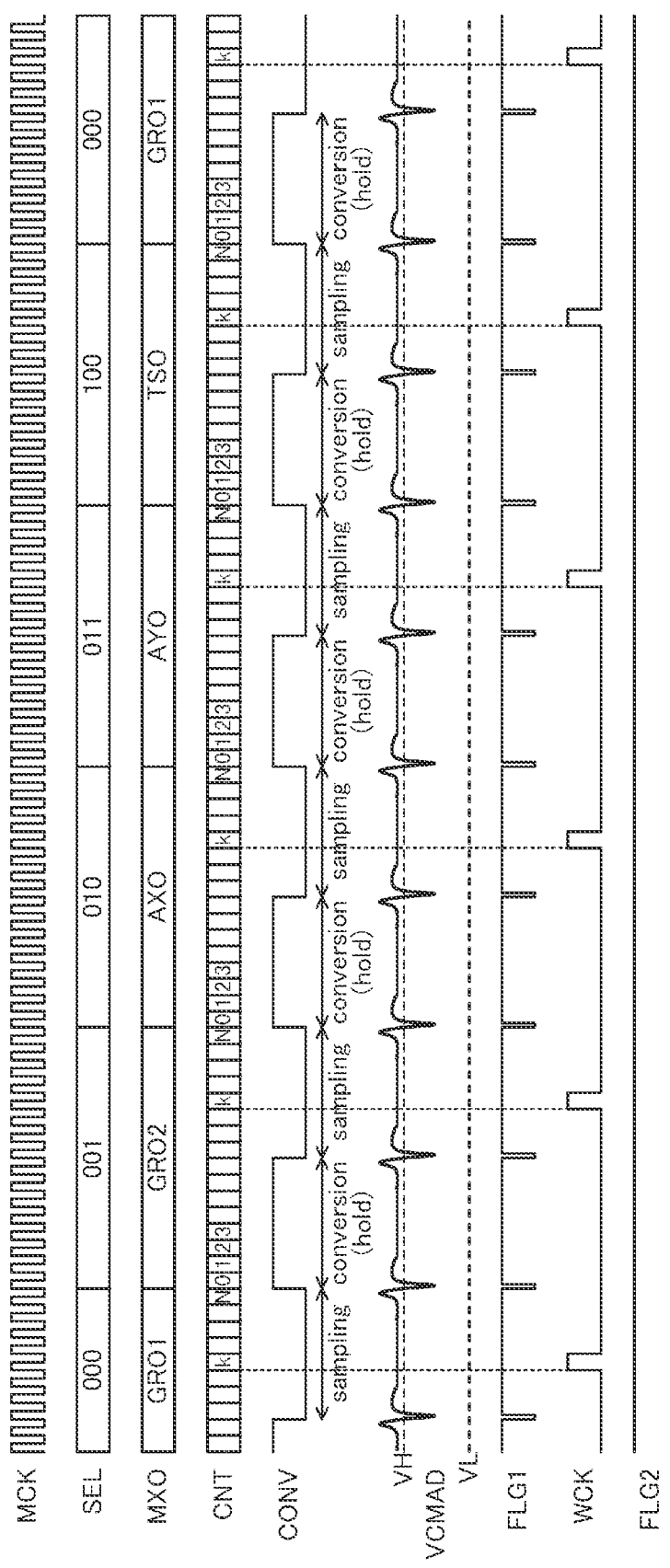
FIG. 6 is a diagram illustrating an example of waveforms of various signals when the reference voltage generation circuit fails in the first embodiment.

In the examples of FIGS. 5 and 6, a state signal CONV is at a low level during a sampling period in which the analog/digital conversion circuit 60 samples a voltage of the output signal MXO of the selection circuit 50, and the state signal CONV is at a high level during a conversion period in which the analog/digital conversion circuit 60 holds the sampled voltage and converts the sampled voltage into the digital signal ADO. As illustrated in FIGS. 5 and 6, the analog/digital conversion circuit 60 alternately repeats the sampling period and the conversion period in synchronization with repetition of the first channel to the fifth channel. In FIG. 1 and FIG. 2 described above, illustration of the state signal CONV is omitted.

In the present embodiment, in order to reduce an area of the reference voltage generation circuit 40, it is assumed that a supply capacity of the full-scale voltage VFSAD to the analog/digital conversion circuit 60 is not always sufficient. Therefore, the full-scale voltage VFSAD greatly varies when the sampling period and the conversion period of the analog/digital conversion circuit 60 are switched, and thereby, the common voltage VCMAD also varies greatly as illustrated in FIGS. 5 and 6. A timing of switching from the conversion period to the sampling period is a timing when the analog/digital conversion circuit 60 starts to sample the output signal MXO of the selection circuit 50. Further, a timing of switching from the sampling period to the conversion period is a timing when the analog/digital conversion circuit 60 ends the sampling of the output signal MXO of the selection circuit 50.

In the example of FIG. 5, the common voltage VCMAD is lower than the threshold voltage VL at the timing when the sampling period and the conversion period that periodically arrive are switched, and as a result, a phenomenon is repeated periodically in which the abnormality determination signal FLG1 is at a high level only for a period of one cycle of the clock signal MCK. Even when the common voltage VCMAD is temporarily lower than the threshold voltage VL at the timing when the sampling period and the conversion period are switched, an operation of the analog/digital conversion circuit 60 is not affected, and thus, the reference voltage generation circuit 40 does not fail. However, if the common voltage VCMAD varies temporarily and the failure diagnosis signal output circuit acquires the abnormality determination signal FLG1 at the timing when the abnormality determination signal FLG1 is temporarily at a high level, the failure diagnosis signal output circuit 82 outputs the failure diagnosis signal FLG2 of a high level. When the external device reads the failure diagnosis signal FLG2 of a high level via the interface circuit 110, the external device erroneously determines that the reference voltage generation circuit 40 fails.

Further, in the example of FIG. 6, the reference voltage generation circuit 40 fails, and the common voltage VCMAD is higher than the threshold voltage VH. Actually, as in the example of FIG. 5, the common voltage VCMAD greatly varies when the sampling period and the conversion period of the analog/digital conversion circuit 60 are switched, the common voltage VCMAD temporarily falls within a range of the threshold voltage VL or more and the threshold voltage VH or less. Therefore, in the example of FIG. 6, in contrast to the example of FIG. 5, the abnormality determination signal FLG1 is temporarily at a low level at the timing when the sampling period and the conversion period are switched. Thus, if the failure diagnosis signal output circuit 82 acquires the abnormality determination signal FLG1 at the timing when the abnormality determination signal FLG1 is temporarily at a low level, the failure diagnosis signal output circuit 82 outputs the failure diagnosis signal FLG2 of a low level. When the external device reads the failure diagnosis signal FLG2 of a low level via the interface circuit 110, the external device erroneously determines that the reference voltage generation circuit 40 does not fail.

In contrast to this, in the present embodiment, the timing when the failure diagnosis signal output circuit 82 acquires the abnormality determination signal FLG1, that is, the timing of the rising edge of the clock signal WCK does not overlap the timing when the common voltage VCMAD varies temporarily. In the present embodiment, the control circuit 90 includes a counter (not illustrated) and generates a control signal for controlling the analog/digital conversion circuit 60 based on a count value CNT of the counter. In the examples of FIGS. 5 and 6, the count value CNT is initialized to 0 in each channel and then increased by 1 from 0 to N, and the operation of the analog/digital conversion circuit 60 is controlled based on the count value CNT. A timing when the count value CNT changes from k−1 to k, which is the timing when the sampling period and the conversion period of the analog/digital conversion circuit 60 are switched, that is, the timing that does not overlap the timing when the common voltage VCMAD varies temporarily, is the timing of the rising edge of the clock signal WCK.

Therefore, in the example of FIG. 5, the failure diagnosis signal output circuit 82 does not acquire the abnormality determination signal FLG1 at the timing when the abnormality determination signal FLG1 is temporarily at a high level, and the failure diagnosis signal FLG2 continuously maintain a low level. Thus, even when an external device reads the failure diagnosis signal FLG2 via the interface circuit 110 at a certain timing, it is possible to make a correct determination that the reference voltage generation circuit 40 does not fail.

Further, in the example of FIG. 6, the failure diagnosis signal output circuit 82 does not acquire the abnormality determination signal FLG1 at the timing when the abnormality determination signal FLG1 is temporarily at a low level, and the failure diagnosis signal FLG2 continuously maintain a high level. Thus, even when an external device reads the failure diagnosis signal FLG2 via the interface circuit 110 at a certain timing, it is possible to make a correct determination that the reference voltage generation circuit 40 fails.

1-1-5. Sequence of Failure Diagnosis Method

A failure diagnosis method of the physical quantity sensor 1 according to the first embodiment includes a failure diagnosis step of performing a failure diagnosis of the reference voltage generation circuit 40 by monitoring the common voltage VCMAD which is one of the reference voltages and of outputting the failure diagnosis signal FLG2 indicating a result of the failure diagnosis, and in the failure diagnosis step, the failure diagnosis is performed at a predetermined timing different from a timing when the common voltage VCMAD varies temporarily according to the operation of the analog/digital conversion circuit 60.

Figure 7:
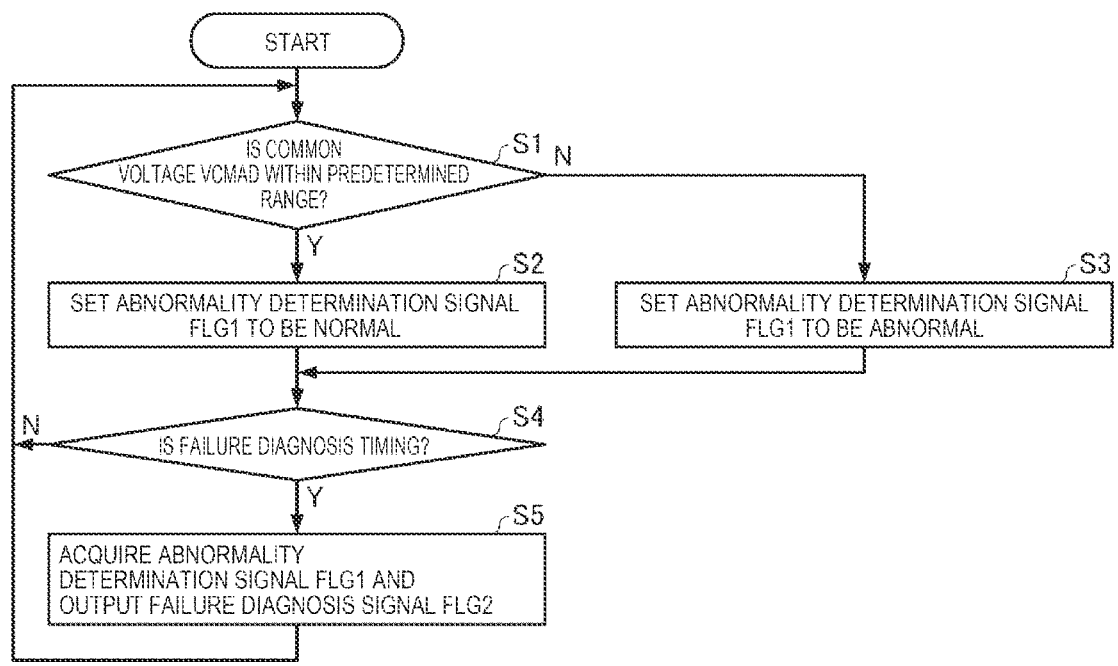
FIG. 7 is a flowchart illustrating an example of a sequence of a failure diagnosis method according to the first embodiment.

FIG. 7 is a flowchart illustrating an example of a sequence of the failure diagnosis method of the physical quantity sensor 1 according to the first embodiment. In the flowchart of FIG. 7, processing of each step may be exchanged as appropriate.

As illustrated in FIG. 7, when the common voltage VCMAD is within a predetermined voltage range (Y in step S1), that is, when the common voltage VCMAD is higher than or equal to the threshold voltage VL and lower than or equal to the threshold voltage VH, the abnormality determination circuit 81 of the physical quantity sensor 1 sets the abnormality determination signal FLG1 to be normal (step S2). Specifically, the abnormality determination circuit 81 sets the abnormality determination signal FLG1 to a low level.

Meanwhile, when the common voltage VCMAD is not within the predetermined voltage range (N in step S1), that is, when the common voltage VCMAD is lower than the threshold voltage VL or higher than the threshold voltage VH, the abnormality determination circuit 81 of the physical quantity sensor 1 sets the abnormality determination signal FLG1 to be abnormal (step S3). Specifically, the abnormality determination circuit 81 sets the abnormality determination signal FLG1 to a high level.

The abnormality determination circuit 81 repeats the processing of steps S1, S2, and S3 until a failure diagnosis timing, which is a predetermined timing, arrives (N in step S4). When the failure diagnosis timing arrives (Y in step S4), the failure diagnosis signal output circuit of the physical quantity sensor 1 acquires the abnormality determination signal FLG1 and outputs the failure diagnosis signal FLG2 (step S5), and the abnormality determination circuit 81 repeats the processing of steps S1, S2 and S3 again.

Steps S1 to S5 in FIG. 7 correspond to the failure diagnosis step. Steps S1, S2 and S3 correspond to an abnormality determination step in which the abnormality determination circuit 81 determines whether or not the common voltage VCMAD, which is one of the reference voltages, is abnormal, and outputs the abnormality determination signal FLG1 indicating the determination result. Further, steps S4 and S5 correspond to a failure diagnosis signal output step in which the failure diagnosis signal output circuit 82 acquires the abnormality determination signal FLG1 at a predetermined timing and outputs the failure diagnosis signal FLG2.

1-1-6. Action Effects

In the first embodiment described above, the physical quantity detection circuit 2 includes the failure diagnosis circuit 80 that monitors the common voltage VCMAD generated by the reference voltage generation circuit 40 and supplied to the analog/digital conversion circuit 60 to perform a failure diagnosis of the reference voltage generation circuit 40 and outputs the failure diagnosis signal FLG2 indicating a result of the failure diagnosis, and the failure diagnosis circuit 80 performs a failure diagnosis at a predetermined timing different from a timing when the common voltage VCMAD varies temporarily according to an operation of the analog/digital conversion circuit 60. According to the present embodiment, the failure diagnosis circuit 80 performs a failure diagnosis at a predetermined timing different from a timing when the common voltage VCMAD varies temporarily according to an operation of the analog/digital conversion circuit 60, and thus, it is possible to reduce a risk of erroneously determining that the reference voltage generation circuit 40 fails even when the common voltage VCMAD varies temporarily. For example, even when a supply capacity of the common voltage VCMAD of the reference voltage generation circuit 40 is relatively reduced, a risk that the failure diagnosis circuit 80 performs an erroneous determination is reduced, and thus, it is possible to reduce a size of the reference voltage generation circuit 40 and to reduce a cost.

Particularly, in the present embodiment, the failure diagnosis circuit 80 performs a failure diagnosis at a predetermined timing different from the timing when the common voltage VCMAD varies temporarily which is a timing when the analog/digital conversion circuit 60 starts sampling or ends sampling, and thus, it is possible to reduce a risk of erroneously determining that the reference voltage generation circuit 40 fails even when the common voltage VCMAD varies temporarily.

Further, in the present embodiment, the failure diagnosis circuit 80 includes the abnormality determination circuit 81 that determines whether or not the common voltage VCMAD is abnormal and outputs the abnormality determination signal FLG1 indicating a determination result, and the failure diagnosis signal output circuit 82 that acquires the abnormality determination signal FLG1 at a predetermined timing different from the timing when the common voltage VCMAD varies temporarily according to an operation of the analog/digital conversion circuit 60 and outputs the failure diagnosis signal FLG2. Thus, according to the present embodiment, when the common voltage VCMAD varies temporarily, even if the abnormality determination circuit 81 temporarily outputs the abnormality determination signal FLG1 indicating that the common voltage VCMAD is abnormal, it is possible to reduce a risk that the failure diagnosis signal output circuit 82 acquires the abnormality determination signal FLG1 indicating that the common voltage VCMAD is abnormal and erroneously outputs the failure diagnosis signal FLG2 indicating that the reference voltage generation circuit 40 fails.

As described above, according to the present embodiment, it is possible to reduce a risk of erroneously determining that the reference voltage generation circuit 40 fails, and thus, it is possible to increase reliability of a failure diagnosis of the physical quantity detection circuit 2 and the physical quantity sensor 1.

1-2. Second Embodiment

In a physical quantity sensor according to a second embodiment to be described below, the same reference numerals will be attached to the same configuration elements as in the first embodiment, description of content overlapping the content of the first embodiment will be omitted or simplified, and content different from the content of the first embodiment will be mainly described.

1-2-1. Configuration of Physical Quantity Sensor

Figure 8:
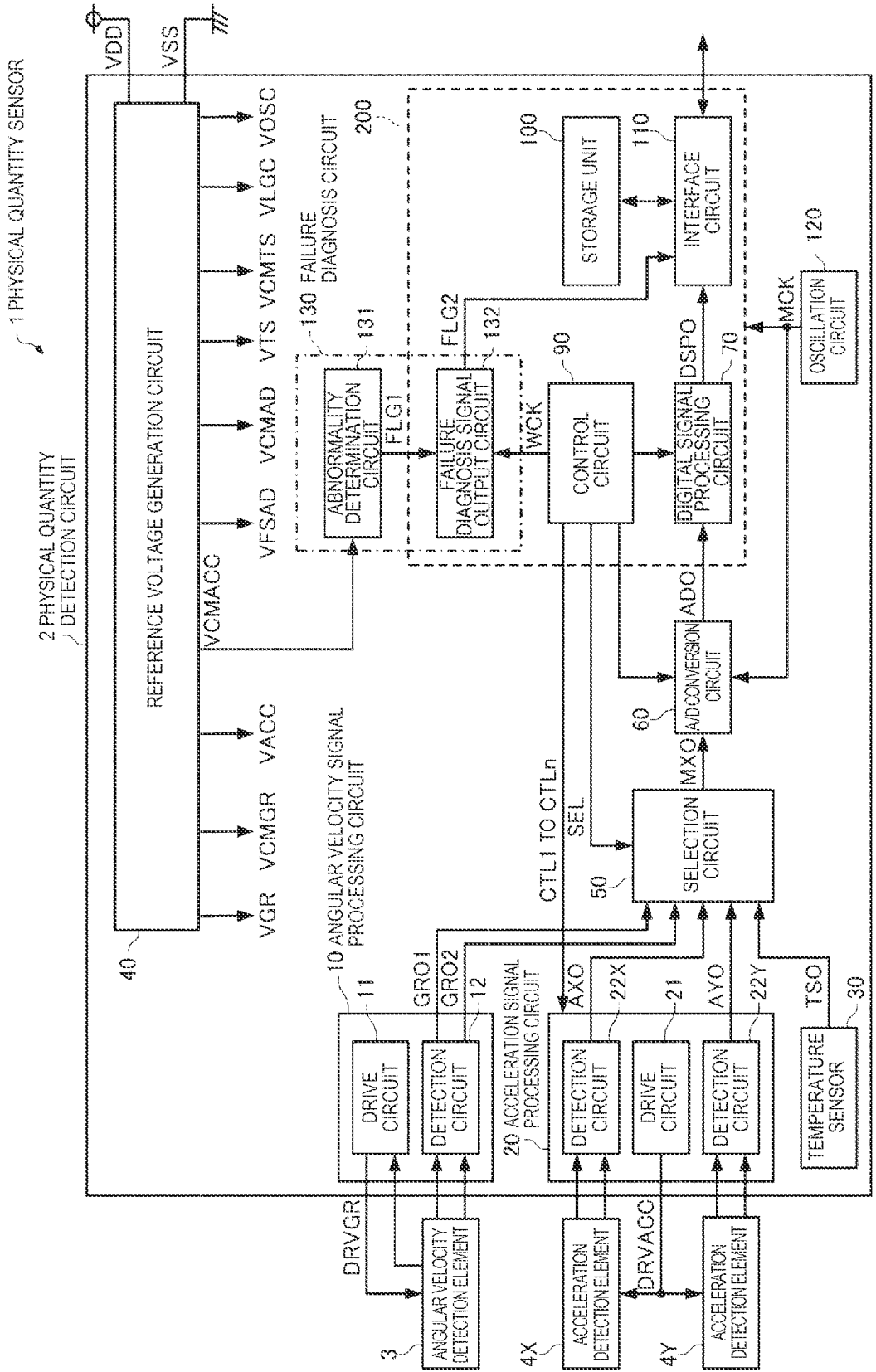
FIG. 8 is a functional block diagram of a physical quantity sensor according to a second embodiment.

FIG. 8 is a functional block diagram of a physical quantity sensor according to a second embodiment. A physical quantity sensor 1 according to the second embodiment includes the physical quantity detection circuit 2, the angular velocity detection element 3, the acceleration detection element 4X, and the acceleration detection element 4Y as in the first embodiment.

Since functions of the angular velocity detection element 3, the acceleration detection element 4X, and the acceleration detection element 4Y are the same as the functions in the first embodiment, description thereof will be omitted.

As in the first embodiment, the physical quantity detection circuit 2 includes the angular velocity signal processing circuit 10, the acceleration signal processing circuit 20, the temperature sensor 30, the reference voltage generation circuit 40, the selection circuit 50, the analog/digital conversion circuit 60, the digital signal processing circuit 70, the control circuit 90, the storage unit 100, the interface circuit 110, the oscillation circuit 120, and the failure diagnosis circuit 130, and may be, for example, realized by an integrated circuit of one chip. The physical quantity detection circuit 2 may have a configuration in which part of the elements is omitted or changed, or other elements are added.

Since functions of the angular velocity signal processing circuit 10, the acceleration signal processing circuit 20, the temperature sensor 30, the reference voltage generation circuit 40, the selection circuit 50, the analog/digital conversion circuit 60, the digital signal processing circuit 70, the control circuit 90, the storage unit 100, the interface circuit 110, and the oscillation circuit 120 are the same as the functions in the first embodiment, description thereof will be omitted.

The failure diagnosis circuit 130 monitors a common voltage VCMACC which is one of reference voltages to perform a failure diagnosis of the reference voltage generation circuit 40, and outputs the failure diagnosis signal FLG2 indicating a result of the failure diagnosis. Particularly, in the present embodiment, the failure diagnosis circuit 130 performs a failure diagnosis of the reference voltage generation circuit 40 at a predetermined timing different from the timing when the common voltage VCMACC varies temporarily according to an operation of the acceleration signal processing circuit 20 which is one of physical quantity signal processing circuits.

For example, the timing when the common voltage VCMACC varies temporarily is a timing of at least one of a rising edge and a falling edge of the drive signal DRVACC, and the failure diagnosis circuit 130 may perform a failure diagnosis at a predetermined timing different from the timing. Further, for example, the timing when the common voltage VCMACC varies temporarily is a timing of at least one of a rising edge and a falling edge of the control signals CTL1 to CTLn generated by the control circuit 90, and the failure diagnosis circuit 130 may perform a failure diagnosis at a predetermined timing different from the timing.

In the present embodiment, the failure diagnosis circuit 130 includes an abnormality determination circuit 131 and a failure diagnosis signal output circuit 132.

The abnormality determination circuit 131 determines whether or not the common voltage VCMACC is abnormal and outputs the abnormality determination signal FLG1 indicating a determination result. For example, the abnormality determination signal FLG1 may be a flag signal that goes to a high level when the common voltage VCMACC is abnormal and goes to a low level when the common voltage VCMACC is normal.

The failure diagnosis signal output circuit 132 acquires the abnormality determination signal FLG1 at a predetermined timing and outputs the failure diagnosis signal FLG2.

For example, the failure diagnosis signal FLG2 may be a flag signal that goes to a high level when the reference voltage generation circuit 40 fails and goes to a low level when the reference voltage generation circuit 40 does not fail. In the present embodiment, the failure diagnosis signal output circuit 132 acquires the abnormality determination signal FLG1 at the timing of a rising edge of the clock signal WCK supplied from the control circuit 90 and outputs the failure diagnosis signal FLG2. As will be described below, the timing of the rising edge of the clock signal WCK is a predetermined timing different from the timing when the common voltage VCMACC varies temporarily according to an operation of the acceleration signal processing circuit 20.

1-2-2. Configuration of Failure Diagnosis Circuit

Figure 9:
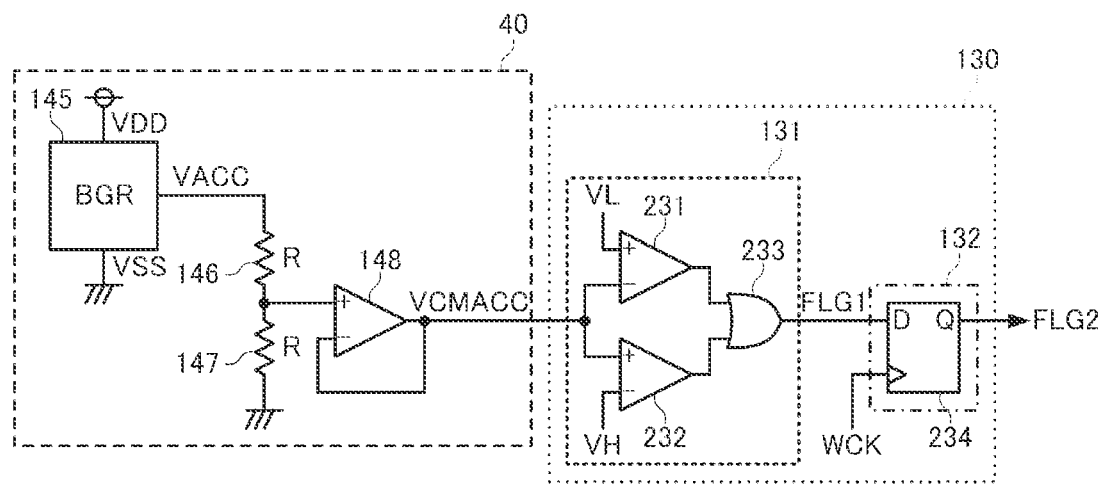
FIG. 9 is a diagram illustrating a configuration example of part of a reference voltage generation circuit and a failure diagnosis circuit, according to the second embodiment.

FIG. 9 is a diagram illustrating a configuration example of part of the reference voltage generation circuit 40 and the failure diagnosis circuit 130. In the example of FIG. 9, the reference voltage generation circuit 40 includes a bandgap reference circuit 145, resistors 146 and 147, and an operational amplifier 148.

The bandgap reference circuit 145 generates a constant power supply voltage VACC which is stable with respect to variation in temperature and the power supply voltage VDD by using a bandgap voltage of a semiconductor element. The configuration of the bandgap reference circuit is well known, and thus, illustration and description thereof will be omitted.

The resistors 146 and 147 have the same resistance value R, and a voltage obtained by dividing the power supply voltage VACC in half by using the resistors 146 and 147 is supplied to a non-inverting input terminal of the operational amplifier 148.

An inverting input terminal of the operational amplifier 148 is coupled to an output terminal of the operational amplifier 148, and the operational amplifier 148 functions as a voltage follower. Thus, a voltage of the output terminal of the operational amplifier 148 is half the power supply voltage VACC, and this voltage is output from the reference voltage generation circuit 40 as the common voltage VCMACC.

The failure diagnosis circuit 130 includes comparators 231 and 232, a logical sum circuit 233, and a D flip-flop 234.

The common voltage VCMACC is supplied to an inverting input terminal of the comparator 231 and a predetermined threshold voltage VL is supplied to a non-inverting input terminal of the comparator 231. An output terminal of the comparator 231 is at a low level when the common voltage VCMACC is higher than or equal to the threshold voltage VL, and is at a high level when the common voltage VCMACC is lower than the threshold voltage VL.

The common voltage VCMACC is supplied to a non-inverting input terminal of the comparator 232, and a predetermined threshold voltage VH higher than the threshold voltage VL is supplied to an inverting input terminal of the comparator 232. An output terminal of the comparator 232 is at a low level when the common voltage VCMACC is lower than or equal to the threshold voltage VH and is at a high level when the common voltage VCMACC is higher than the threshold voltage VH.

The logical sum circuit 233 receives output signals of the comparators 231 and 232 and outputs a logical sum signal of the output signals. That is, an output signal of the logical sum circuit 233 is at a low level when the output signals of the comparators 231 and 232 are at a low level and is at a high level when at least one of the output signals of the comparators 231 and 232 is at a high level.

Thus, the output signal of the logical sum circuit 233 is at a low level when the common voltage VCMAD is higher than or equal to the threshold voltage VL and is lower than or equal to the threshold voltage VH, and is at a high level when the common voltage VCMAD is lower than the threshold voltage VL or is higher than the threshold voltage VH. The abnormality determination circuit 131 is configured by the comparators 231 and 232 and the logical sum circuit 233, and the output signal of the logical sum circuit 233 becomes the abnormality determination signal FLG1. That is, the abnormality determination circuit 131 determines that the common voltage VCMACC is normal when the common voltage VCMACC is higher than or equal to the threshold voltage VL and is lower than or equal to the threshold voltage VH, determines that the common voltage VCMACC is abnormal when the common voltage VCMACC is lower than the threshold voltage VL or higher than the threshold voltage VH, and outputs the abnormality determination signal FLG1 indicating a determination result.

The threshold voltages VL and VH may be fixed values or may be variably set in the storage unit 100.

The D flip-flop 234 has a data input terminal D that receives the abnormality determination signal FLG1 and has a clock input terminal that receives the clock signal WCK. The D flip-flop 234 acquires the abnormality determination signal FLG1 at the timing of the rising edge of the clock signal WCK and outputs the failure diagnosis signal FLG2.

In the example of FIG. 9, the common voltage VCMACC is obtained by dividing the power supply voltage VACC in half by using the resistors 146 and 147, and thus, when the power supply voltage VACC is constantly abnormal, the common voltage VCMACC is also abnormal constantly, and the abnormality determination signal FLG1 is constantly at a high level. Thus, even when the operational amplifier 148 fails and the common voltage VCMACC is constantly abnormal, or even when the bandgap reference circuit 145 fails and the power supply voltage VACC is constantly abnormal, the failure diagnosis signal FLG2 is at a high level, and the failure diagnosis circuit 130 can diagnose that the reference voltage generation circuit 40 fails.

Figure 10:
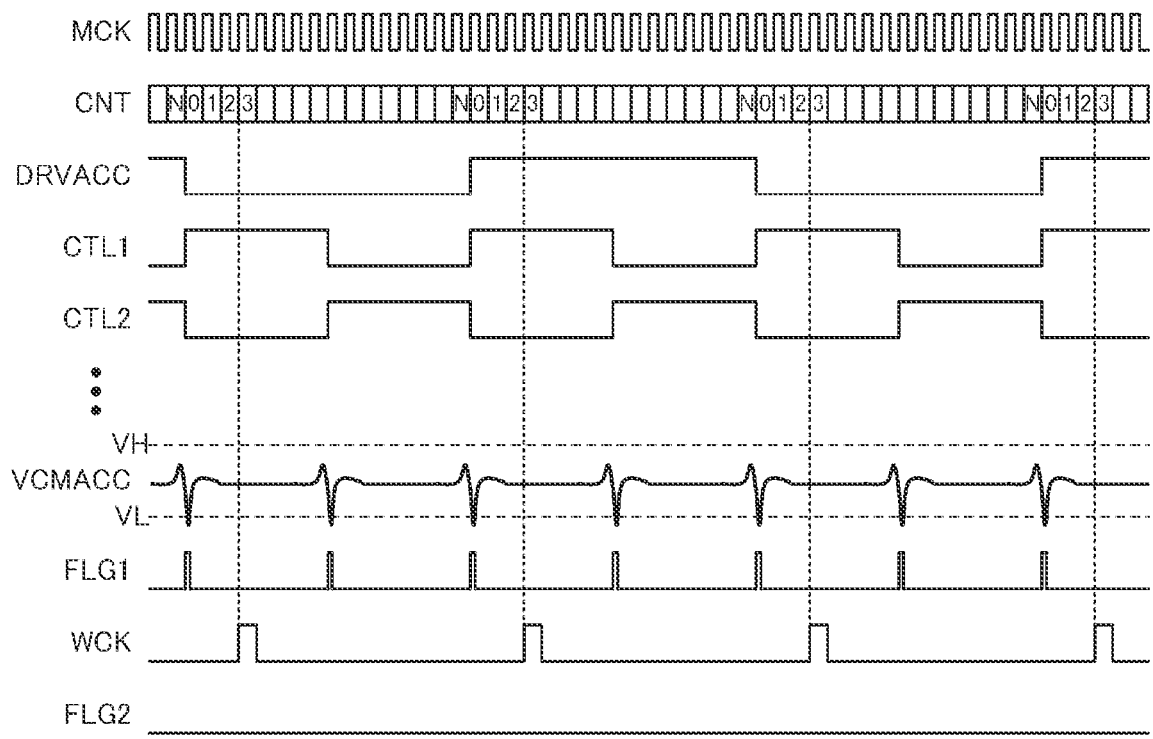
FIG. 10 is a diagram illustrating an example of waveforms of various signals when the reference voltage generation circuit does not fail in the second embodiment.

FIG. 10 is a diagram illustrating an example of waveforms of various signals including the common voltage VCMACC, the abnormality determination signal FLG1, and the failure diagnosis signal FLG2 when the reference voltage generation circuit 40 does not fail. Further, FIG. 11 is a diagram illustrating an example of waveforms of various signals including the common voltage VCMACC, the abnormality determination signal FLG1, and the failure diagnosis signal FLG2 when the reference voltage generation circuit 40 fails.

In the present embodiment, in order to reduce an area of the reference voltage generation circuit 40, it is assumed that a supply capacity of the power supply voltage VACC to the acceleration signal processing circuit 20 is not always sufficient. Since a high level of the drive signal DRVACC is the power supply voltage VACC, the power supply voltage VACC varies greatly at a timing of a rising edge and a falling edge of the drive signal DRVACC, and accordingly, the common voltage VCMACC also varies greatly as illustrated in FIGS. 10 and 11. Likewise, since a high level of the control signals CTL1 to CTLn is the power supply voltage VACC, the power supply voltage VACC varies greatly at a timing of rising edges and falling edges of the control signals CTL1 to CTLn, and accordingly, the common voltage VCMACC also varies greatly as illustrated in FIGS. 10 and 11.

In the example of FIG. 10, the common voltage VCMACC is lower than the threshold voltage VL at the timing of the rising edge and the falling edge of the drive signal DRVACC and at the timing of the rising edges and the falling edges of the control signals CTL1 to CTLn, and as a result, a phenomenon is periodically repeated in which the abnormality determination signal FLG1 is at a high level only for a period of one cycle of the clock signal MCK. Even when the common voltage VCMACC is temporarily lower than the threshold voltage VL at a timing of the edges, an operation of the acceleration signal processing circuit 20 is not affected, and thus, the reference voltage generation circuit 40 does not fail. However, if the common voltage VCMACC varies temporarily and the failure diagnosis signal output circuit 132 acquires the abnormality determination signal FLG1 at the timing when the abnormality determination signal FLG1 temporarily goes to a high level, the failure diagnosis signal output circuit 132 outputs the failure diagnosis signal FLG2 of a high level. When the external device reads the failure diagnosis signal FLG2 of a high level via the interface circuit 110, the external device erroneously determines that the reference voltage generation circuit 40 fails.

Figure 11:
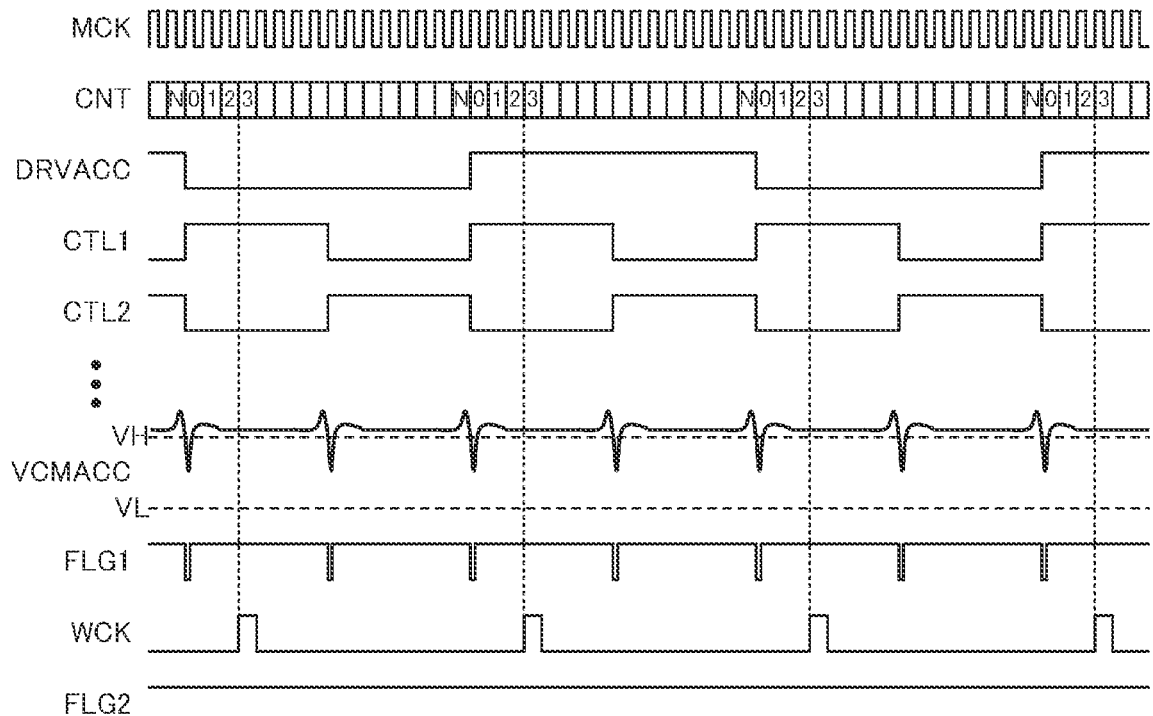
FIG. 11 is a diagram illustrating an example of waveforms of various signals when the reference voltage generation circuit fails in the second embodiment.

Further, in the example of FIG. 11, the reference voltage generation circuit 40 fails, and the common voltage VCMACC is higher than the threshold voltage VH. Actually, as in the example of FIG. 10, the common voltage VCMACC varies greatly at the timing of the rising edge and the falling edge of the drive signal DRVACC and at the timing of the rising edges and the falling edges of the control signals CTL1 to CTLn, and thus, the common voltage VCMACC temporarily falls within a range of the threshold voltage VL or higher and the threshold voltage VH or lower. Therefore, in the example of FIG. 11, in contrast to the example of FIG. 10, the abnormality determination signal FLG1 is temporarily at a low level at the timing of the edges. Thus, if the failure diagnosis signal output circuit 132 acquires the abnormality determination signal FLG1 at the timing when the abnormality determination signal FLG1 is temporarily at a low level, the failure diagnosis signal output circuit 132 outputs the failure diagnosis signal FLG2 of a low level. When the external device reads the failure diagnosis signal FLG2 of a low level via the interface circuit 110, the external device erroneously determines that the reference voltage generation circuit 40 does not fail.

In contrast to this, in the present embodiment, the timing when the failure diagnosis signal output circuit 132 acquires the abnormality determination signal FLG1, that is, the timing of the rising edge of the clock signal WCK does not overlap the timing when the common voltage VCMACC varies temporarily. In the present embodiment, the control circuit 90 includes a counter (not illustrated) and generates the control signals CTL1 to CTLn for controlling the acceleration signal processing circuit 20 based on the count value CNT of the counter. The acceleration signal processing circuit 20 generates the drive signal DRVACC based on at least part of the control signals CTL1 to CTLn. In the examples of FIGS. 10 and 11, the count value CNT is initialized to 0 and then is increased by 1 from 0 to N in each period when the drive signal DRVACC is at a low level and in each period when the drive signal DRVACC is at a high level, and an operation of the acceleration signal processing circuit 20 is controlled based on the count value CNT. The timing of the rising edge or the falling edge of the drive signal DRVACC, and the timing of the rising edge or the falling edge of each of the control signals CTL1 to CTLn, that is, the timing which does not overlap the timing when the common voltage VCMACC varies temporarily and at which the count value CNT changes from 2 to 3, are set as the timing of the rising edge of the clock signal WCK.

Therefore, in the example of FIG. 10, the failure diagnosis signal output circuit 132 does not acquire the abnormality determination signal FLG1 at the timing when the abnormality determination signal FLG1 is temporarily at a high level, and the failure diagnosis signal FLG2 continuously maintain a low level. Thus, even when an external device reads the failure diagnosis signal FLG2 via the interface circuit 110 at a certain timing, it is possible to make a correct determination that the reference voltage generation circuit 40 does not fail.

Further, in the example of FIG. 11, the failure diagnosis signal output circuit 132 does not acquire the abnormality determination signal FLG1 at the timing when the abnormality determination signal FLG1 is temporarily at a low level, and the failure diagnosis signal FLG2 continuously maintain a high level. Thus, even when an external device reads the failure diagnosis signal FLG2 via the interface circuit 110 at a certain timing, it is possible to make a correct determination that the reference voltage generation circuit 40 fails.

1-2-3. Sequence of Failure Diagnosis Method

A failure diagnosis method of the physical quantity sensor 1 according to the second embodiment includes a failure diagnosis step of performing a failure diagnosis of the reference voltage generation circuit 40 by monitoring the common voltage VCMACC which is one of the reference voltages and of outputting the failure diagnosis signal FLG2 indicating a result of the failure diagnosis, and in the failure diagnosis step, the failure diagnosis is performed at a predetermined timing different from the timing when the common voltage VCMACC varies temporarily according to the operation of the acceleration signal processing circuit 20.

Figure 12:
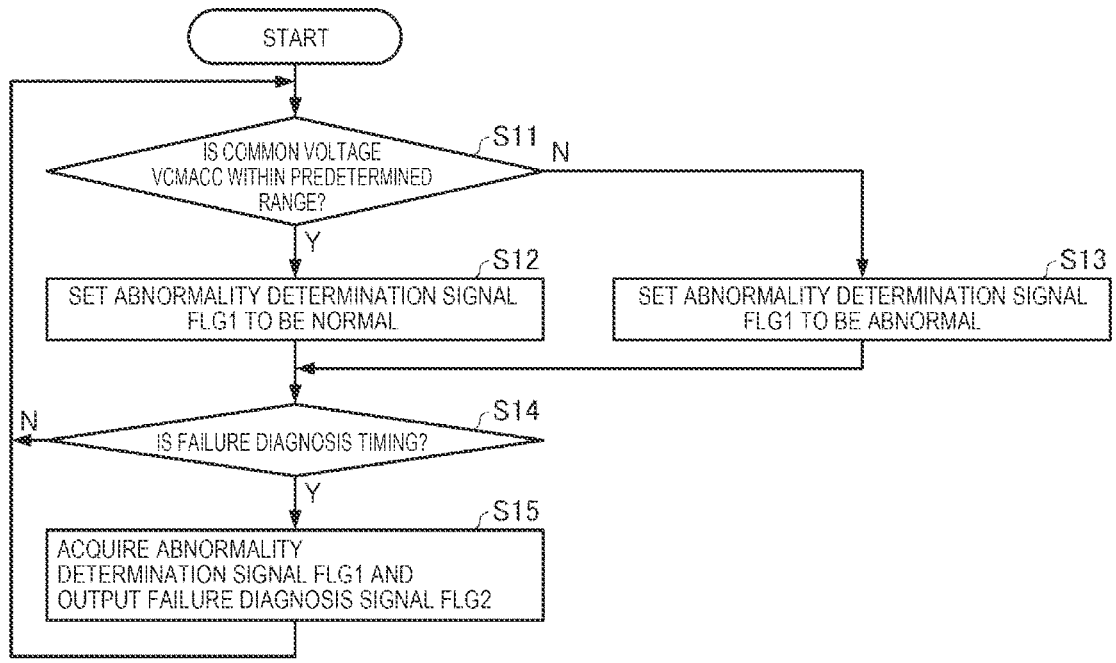
FIG. 12 is a flowchart illustrating an example of a sequence of a failure diagnosis method according to the second embodiment.

FIG. 12 is a flowchart illustrating an example of a sequence of the failure diagnosis method of the physical quantity sensor 1 according to the second embodiment. In the flowchart of FIG. 12, processing of each step may be exchanged as appropriate.

As illustrated in FIG. 12, when the common voltage VCMACC is within a predetermined voltage range (Y in step S11), that is, when the common voltage VCMACC is higher than or equal to the threshold voltage VL and lower than or equal to the threshold voltage VH, the abnormality determination circuit 131 of the physical quantity sensor 1 sets the abnormality determination signal FLG1 to be normal (step S12). Specifically, the abnormality determination circuit 131 sets the abnormality determination signal FLG1 to a low level.

Meanwhile, when the common voltage VCMACC is not within the predetermined voltage range (N in step S11), that is, when the common voltage VCMACC is lower than the threshold voltage VL or higher than the threshold voltage VH, the abnormality determination circuit 131 of the physical quantity sensor 1 sets the abnormality determination signal FLG1 to be abnormal (step S13). Specifically, the abnormality determination circuit 131 sets the abnormality determination signal FLG1 to a high level.

The abnormality determination circuit 131 repeats the processing of steps S11, S12, and S13 until a failure diagnosis timing, which is a predetermined timing, arrives (N in step S14). When the failure diagnosis timing arrives (Y in step S14), the failure diagnosis signal output circuit 132 of the physical quantity sensor 1 acquires the abnormality determination signal FLG1 and outputs the failure diagnosis signal FLG2 (step S15), and the abnormality determination circuit 131 repeats the processing of steps S11, S12 and S13 again.

Steps S11 to S15 of FIG. 12 correspond to the failure diagnosis step. Steps S11, S12, and S13 correspond to the abnormality determination step in which the abnormality determination circuit 131 determines whether or not the common voltage VCMACC, which is one of the reference voltages, is abnormal, and outputs the abnormality determination signal FLG1 indicating a determination result. Further, steps S14 and S15 correspond to the failure diagnosis signal output step in which the failure diagnosis signal output circuit 132 acquires the abnormality determination signal FLG1 at a predetermined timing and outputs the failure diagnosis signal FLG2.

In the second embodiment described above, the physical quantity detection circuit 2 includes the failure diagnosis circuit 130 that performs a failure diagnosis of the reference voltage generation circuit 40 by monitoring the common voltage VCMACC generated by the reference voltage generation circuit 40 and supplied to the acceleration signal processing circuit 20, and outputs the failure diagnosis signal FLG2 indicating a result of the failure diagnosis, and the failure diagnosis circuit 130 performs the failure diagnosis at a predetermined timing different from the timing when the common voltage VCMACC varies temporarily according to an operation of the acceleration signal processing circuit 20. According to the present embodiment, the failure diagnosis circuit 130 performs a failure diagnosis at a predetermined timing different from the timing when the common voltage VCMACC varies temporarily according to an operation of the acceleration signal processing circuit 20, and thus, it is possible to reduce a risk of erroneously determining that the reference voltage generation circuit 40 fails even when the common voltage VCMACC varies temporarily. For example, even when a supply capacity of the common voltage VCMACC of the reference voltage generation circuit 40 is relatively reduced, a risk that the failure diagnosis circuit 130 performs an erroneous determination is reduced, and thus, it is possible to reduce a size of the reference voltage generation circuit 40 and to reduce a cost.

Particularly, in the present embodiment, the failure diagnosis circuit 130 performs a failure diagnosis at a predetermined timing different from the timing when the common voltage VCMACC varies temporarily, and the rising edge and the falling edge of the drive signals DRVACC for driving the acceleration detection elements 4X and 4Y and the rising edge and the falling edge of each of the control signals CTL1 to CTLn for controlling the acceleration signal processing circuit 20, and thus, it is possible to reduce a risk of erroneously determining that the reference voltage generation circuit 40 fails even when the common voltage VCMACC varies temporarily.

Further, in the present embodiment, the failure diagnosis circuit 130 includes the abnormality determination circuit 131 that determines whether or not the common voltage VCMACC is abnormal and outputs the abnormality determination signal FLG1 indicating a determination result, and the failure diagnosis signal output circuit 132 that acquires the abnormality determination signal FLG1 at a predetermined timing different from the timing when the common voltage VCMAD varies temporarily according to an operation of the acceleration signal processing circuit 20 and outputs the failure diagnosis signal FLG2. Thus, according to the present embodiment, when the common voltage VCMACC varies temporarily, even if the abnormality determination circuit 131 temporarily outputs the abnormality determination signal FLG1 indicating that the common voltage VCMACC is abnormal, it is possible to reduce a risk that the failure diagnosis signal output circuit 132 acquires the abnormality determination signal FLG1 indicating that the common voltage VCMACC is abnormal and erroneously output the failure diagnosis signal FLG2 indicating that the reference voltage generation circuit 40 fails.

As such, according to the present embodiment, a risk of erroneously determining that the reference voltage generation circuit 40 fails can be reduced, and thus, it is possible to increase reliability of a failure diagnosis of the physical quantity detection circuit 2 and the physical quantity sensor 1.

1-3. Modification Examples

For example, in the first embodiment described above, the failure diagnosis circuit 80 monitors the common voltage VCMAD, and in the second embodiment described above, the failure diagnosis circuit 130 monitors the common voltage VCMACC, but the failure diagnosis circuit may monitor both the common voltage VCMAD and the common voltage VCMACC. That is, the physical quantity sensor 1 may have a configuration in which the first embodiment and the second embodiment are combined.

Further, in the first embodiment described above, the failure diagnosis circuit 80 monitors the common voltage VCMAD but may monitor the full-scale voltage VFSAD or may monitor any voltage that varies according to a variation of the full-scale voltage VFSAD. Further, in the second embodiment described above, the failure diagnosis circuit 130 monitors the common voltage VCMACC but may monitor the power supply voltage VACC or may monitor any voltage that varies according to a variation of the power supply voltage VACC. Alternatively, the failure diagnosis circuit may monitor any voltage that varies according to a variation of the power supply voltage VGR such as the common voltage VCMGR or may monitor the power supply voltage VGR.

Further, in each of the above-described embodiments, the physical quantity sensor 1 detects both an angular velocity and an acceleration as a physical quantity but may detect either the angular velocity or the acceleration. Further, the physical quantity sensor 1 may detect physical quantities other than the angular velocity and the acceleration as a physical quantity.

Further, in each embodiment described above, the analog/digital conversion circuit 60 receives a differential signal and converts the differential signal into the digital signal ADO but may receive a single-end signal and convert the single-end signal into the digital signal ADO.

Further, in each embodiment described above, the physical quantity sensor 1 includes the angular velocity detection element 3, the acceleration detection element 4X, and the acceleration detection element 4Y but may be a sensor including only part of the physical quantity detection elements. Further, the physical quantity sensor 1 may include a physical quantity detection element that detects a physical quantity other than an angular velocity and an acceleration, for example, a physical quantity detection element that detects a physical quantity such as an angular acceleration, a speed, and a force.

Further, in each embodiment described above, an example in which a vibrator element of the angular velocity detection element 3 is a double T type quartz crystal vibrator element is described, but the vibrator element of the physical quantity detection element that detects various physical quantities may be, for example, a tuning fork type or a comb teeth type or may be a sound piece type such as a triangular prism, a quadrangular prism, or a cylindrical shape. Further, a piezoelectric material, for example, a piezoelectric single crystal such as lithium tantalate ($LiTaO_3$) or lithium niobate ($LiNbO_3$), a piezoelectric ceramic such as lead zirconate titanate (PZT), or the like may be used or a silicon semiconductor may be used as a material of a vibrator element of the physical quantity detection element instead of quartz crystal ($SiO_2$). Further, the vibrator element of the physical quantity detection element may have a structure in which, for example, a piezoelectric thin film such as zinc oxide (ZnO) or aluminum nitride (AlN) interposed between drive electrodes is disposed at a part of a surface of the silicon semiconductor.

Further, in each embodiment described above, the piezoelectric type angular velocity detection element 3 and the capacitive type acceleration detection elements 4X and 4Y are exemplified, but the physical quantity detection element that detects various physical quantities is not limited to the piezoelectric type or capacitive type element and may be an element of an electrodynamic type, an eddy current type, an optical type, a strain gauge type, or the like. Further, a detection type of the physical quantity detection element is not limited to the vibration type and may be, for example, an optical type, a rotary type, or a fluid type.

The above-described embodiments and modification examples are merely examples, and the present disclosure is not limited to these. For example, each embodiment and each modification example may be combined as appropriate.

The present disclosure includes configurations that are substantially the same as the configurations described in the embodiments (for example, configurations having the same functions, methods, and results, or configurations having the same objects and effects). In addition, the present disclosure includes a configuration in which a non-essential part of the configuration described in the embodiment is replaced. In addition, the present disclosure includes a configuration that achieves the same action effect as the configuration described in the embodiment or a configuration that can achieve the same object. In addition, the present disclosure includes a configuration obtained by adding a known technique to the configuration described in the embodiment.

The following content is derived from the above-described embodiments and modification examples.

One aspect of a physical quantity detection circuit includes a detection signal generation circuit that generates a detection signal according to a physical quantity based on an output signal of a physical quantity detection element that detects the physical quantity, an analog/digital conversion circuit that converts the detection signal into a digital signal, a reference voltage generation circuit that generates a reference voltage supplied to the analog/digital conversion circuit, and a failure diagnosis circuit that performs a failure diagnosis of the reference voltage generation circuit by monitoring the reference voltage and outputs a failure diagnosis signal indicating a result of the failure diagnosis, in which the failure diagnosis circuit performs the failure diagnosis at a predetermined timing different from a timing when the reference voltage varies temporarily according to an operation of the analog/digital conversion circuit.

According to the physical quantity detection circuit, the failure diagnosis circuit performs a failure diagnosis at the predetermined timing different from the timing when the reference voltage varies temporarily according to an operation of the analog/digital conversion circuit, and thus, it is possible to reduce a risk of erroneously determining that the reference voltage generation circuit fails even when the reference voltage varies temporarily. For example, even when a supply capacity of the reference voltage of the reference voltage generation circuit is relatively reduced, a risk that the failure diagnosis circuit performs an erroneous determination is reduced, and thus, it is possible to reduce a size of the reference voltage generation circuit and to reduce a cost of the physical quantity detection circuit.

In one aspect of the physical quantity detection circuit, the timing when the reference voltage varies temporarily may be the timing when the analog/digital conversion circuit starts to sample the detection signal.

According to the physical quantity detection circuit, the failure diagnosis circuit performs a failure diagnosis at a predetermined timing different from the timing when the reference voltage varies temporarily and the analog/digital conversion circuit starts to sample the detection signal, and thus, even when the reference voltage varies temporarily, it is possible to reduce a risk of erroneously determining that the reference voltage generation circuit fails.

In one aspect of the physical quantity detection circuit, the timing when the reference voltage varies temporarily may be a timing when the analog/digital conversion circuit ends sampling of the detection signal.

According to the physical quantity detection circuit, the failure diagnosis circuit performs a failure diagnosis at a predetermined timing different from the timing when the reference voltage varies temporarily and the analog/digital conversion circuit ends sampling of the detection signal, and thus, even when the reference voltage varies temporarily, it is possible to reduce a risk of erroneously determining that the reference voltage generation circuit fails.

One aspect of a physical quantity detection circuit includes a physical quantity signal processing circuit that outputs a drive signal for driving a physical quantity detection element which detects a physical quantity and that generates a detection signal according to the physical quantity based on an output signal of the physical quantity detection element, a reference voltage generation circuit that generates a reference voltage supplied to the physical quantity signal processing circuit, and a failure diagnosis circuit that performs a failure diagnosis of the reference voltage generation circuit by monitoring the reference voltage and outputs a failure diagnosis signal indicating a result of the failure diagnosis, in which the failure diagnosis circuit performs the failure diagnosis at a predetermined timing different from a timing when the reference voltage varies temporarily according to an operation of the physical quantity signal processing circuit.

According to the physical quantity detection circuit, the failure diagnosis circuit performs a failure diagnosis at the predetermined timing different from the timing when the reference voltage varies temporarily according to an operation of the physical quantity signal processing circuit, and thus, even when the reference voltage varies temporarily, it is possible to reduce a risk of erroneously determining that the reference voltage generation circuit fails. For example, even when a supply capacity of the reference voltage of the reference voltage generation circuit is relatively reduced, a risk that the failure diagnosis circuit performs an erroneous determination is reduced, and thus, it is possible to reduce a size of the reference voltage generation circuit and to reduce a cost of the physical quantity detection circuit.

In one aspect of the physical quantity detection circuit, the timing when the reference voltage varies temporarily may be a timing of at least one of a rising edge and a falling edge of the drive signal.

According to the physical quantity detection circuit, the failure diagnosis circuit performs a failure diagnosis at a predetermined timing different from the timing when the reference voltage varies temporarily and the timing of at least one of the rising edge and the falling edge of the drive signal, and thus, even when the reference voltage varies temporarily, it is possible to reduce a risk of erroneously determining that the reference voltage generation circuit fails.

One aspect of the physical quantity detection circuit includes a control circuit that generates a control signal for controlling the physical quantity signal processing circuit, and the timing when the reference voltage varies temporarily may be a timing of at least one of a rising edge and a falling edge of the control signal.

According to the physical quantity detection circuit, the failure diagnosis circuit performs a failure diagnosis at a predetermined timing different from the timing when the reference voltage varies temporarily and the timing of at least one of the rising edge and the falling edge of the control signal, and thus, even when the reference voltage varies temporarily, it is possible to reduce a risk of erroneously determining that the reference voltage generation circuit fails.

In one aspect of the physical quantity detection circuit, the failure diagnosis circuit may include an abnormality determination circuit that determines whether or not the reference voltage is abnormal and outputs an abnormality determination signal indicating a determination result, and a failure diagnosis signal output circuit that acquires the abnormality determination signal at the predetermined timing and outputs the failure diagnosis signal.

According to the physical quantity detection circuit, when the reference voltage varies temporarily, even if the abnormality determination circuit temporarily outputs an abnormality determination signal indicating that the reference voltage is abnormal, it is possible to reduce a risk that the failure diagnosis signal output circuit acquires the abnormality determination signal indicating that the reference voltage is abnormal and erroneously outputs a failure diagnosis signal indicating that the reference voltage generation circuit fails.

One aspect of a physical quantity sensor includes one aspect of the physical quantity detection circuit, and the physical quantity detection element.

According to the physical quantity sensor, a physical quantity detection circuit is provided which is capable of reducing a risk of erroneously determining that a reference voltage generation circuit fails even if a reference voltage varies temporarily, and thus, high reliability can be achieved.

One aspect of a failure diagnosis method of a physical quantity sensor is a failure diagnosis method of a physical quantity sensor including a physical quantity detection element that detects a physical quantity, a detection circuit that generates a detection signal according to the physical quantity based on an output signal of the physical quantity detection element, an analog/digital conversion circuit that converts the detection signal into a digital signal, and a reference voltage generation circuit that generates a reference voltage supplied to the analog/digital conversion circuit, and includes a failure diagnosis step of performing a failure diagnosis of the reference voltage generation circuit by monitoring the reference voltage and outputting a failure diagnosis signal indicating a result of the failure diagnosis, in which the failure diagnosis is performed at a predetermined timing different from a timing when the reference voltage varies temporarily according to an operation of the analog/digital conversion circuit during the failure diagnosis step.

According to the failure diagnosis method of the physical quantity sensor, a failure diagnosis is performed at the predetermined timing different from the timing when the reference voltage varies temporarily according to an operation of the analog/digital conversion circuit during the failure diagnosis step, and thus, even when the reference voltage varies temporarily, it is possible to reduce a risk of erroneously determining that the reference voltage generation circuit fails.

One aspect of a failure diagnosis method of a physical quantity sensor is a failure diagnosis method of a physical quantity sensor including a physical quantity detection element that detects a physical quantity, a physical quantity signal processing circuit that outputs a drive signal for driving the physical quantity detection element and generates a detection signal according to the physical quantity based on an output signal of the physical quantity detection element, and a reference voltage generation circuit that generates a reference voltage supplied to the physical quantity signal processing circuit, and includes a failure diagnosis step of performing a failure diagnosis of the reference voltage generation circuit by monitoring the reference voltage and outputting a failure diagnosis signal indicating a result of the failure diagnosis, in which the failure diagnosis is performed at a predetermined timing different from a timing when the reference voltage varies temporarily according to an operation of the physical quantity signal processing circuit during the failure diagnosis step.

According to the failure diagnosis method of a physical quantity sensor, a failure diagnosis is performed at the predetermined timing different from the timing when the reference voltage varies temporarily according to an operation of the physical quantity signal processing circuit during the failure diagnosis step, and thus, even when the reference voltage varies temporarily, it is possible to reduce a risk of erroneously determining that the reference voltage generation circuit fails.

What is claimed is:

1. A physical quantity detection circuit comprising:
   a detection signal generation circuit that generates a detection signal according to a physical quantity based on an output signal of a physical quantity detection element that detects the physical quantity;
   an analog/digital conversion circuit that converts the detection signal into a digital signal;
   a reference voltage generation circuit that generates a reference voltage supplied to the analog/digital conversion circuit; and
   a failure diagnosis circuit that performs a failure diagnosis of the reference voltage generation circuit by monitoring the reference voltage and outputs a failure diagnosis signal indicating a result of the failure diagnosis, wherein
   the failure diagnosis circuit performs the failure diagnosis at a predetermined timing different from a timing when the reference voltage varies temporarily according to an operation of the analog/digital conversion circuit.

2. The physical quantity detection circuit according to claim 1, wherein the timing when the reference voltage varies temporarily is a timing when the analog/digital conversion circuit starts to sample the detection signal.

3. The physical quantity detection circuit according to claim 1, wherein the timing when the reference voltage varies temporarily is a timing when the analog/digital conversion circuit ends sampling of the detection signal.

4. A physical quantity detection circuit comprising:
a physical quantity signal processing circuit that outputs a drive signal for driving a physical quantity detection element which detects a physical quantity and that generates a detection signal according to the physical quantity based on an output signal of the physical quantity detection element;
a reference voltage generation circuit that generates a reference voltage supplied to the physical quantity signal processing circuit; and
a failure diagnosis circuit that performs a failure diagnosis of the reference voltage generation circuit by monitoring the reference voltage and outputs a failure diagnosis signal indicating a result of the failure diagnosis, wherein
the failure diagnosis circuit performs the failure diagnosis at a predetermined timing different from a timing when the reference voltage varies temporarily according to an operation of the physical quantity signal processing circuit.

5. The physical quantity detection circuit according to claim 4, wherein the timing when the reference voltage varies temporarily is a timing of at least one of a rising edge and a falling edge of the drive signal.

6. The physical quantity detection circuit according to claim 4, further comprising:
a control circuit that generates a control signal for controlling the physical quantity signal processing circuit, wherein
the timing when the reference voltage varies temporarily is a timing of at least one of a rising edge and a falling edge of the control signal.

7. The physical quantity detection circuit according to claim 1, wherein the failure diagnosis circuit includes
an abnormality determination circuit that determines whether or not the reference voltage is abnormal and outputs an abnormality determination signal indicating a determination result, and
a failure diagnosis signal output circuit that acquires the abnormality determination signal at the predetermined timing and outputs the failure diagnosis signal.

8. A physical quantity sensor comprising:
the physical quantity detection circuit according to claim 1; and
the physical quantity detection element.

9. A failure diagnosis method of a physical quantity sensor including a physical quantity detection element that detects a physical quantity, a detection circuit that generates a detection signal according to the physical quantity based on an output signal of the physical quantity detection element, an analog/digital conversion circuit that converts the detection signal into a digital signal, and a reference voltage generation circuit that generates a reference voltage supplied to the analog/digital conversion circuit, the method comprising:
a failure diagnosis step of performing a failure diagnosis of the reference voltage generation circuit by monitoring the reference voltage and outputting a failure diagnosis signal indicating a result of the failure diagnosis, wherein
the failure diagnosis is performed at a predetermined timing different from a timing when the reference voltage varies temporarily according to an operation of the analog/digital conversion circuit during the failure diagnosis step.

10. A failure diagnosis method of a physical quantity sensor including a physical quantity detection element that detects a physical quantity, a physical quantity signal processing circuit that outputs a drive signal for driving the physical quantity detection element and generates a detection signal according to the physical quantity based on an output signal of the physical quantity detection element, and a reference voltage generation circuit that generates a reference voltage supplied to the physical quantity signal processing circuit, the method comprising:
a failure diagnosis step of performing a failure diagnosis of the reference voltage generation circuit by monitoring the reference voltage and outputting a failure diagnosis signal indicating a result of the failure diagnosis, wherein
the failure diagnosis is performed at a predetermined timing different from a timing when the reference voltage varies temporarily according to an operation of the physical quantity signal processing circuit during the failure diagnosis step.

* * * * *